United States Patent
Batta

(10) Patent No.: US 11,700,653 B2
(45) Date of Patent: Jul. 11, 2023

(54) CONTEXT-BASED WIRELESS-PROTOCOL CONNECTIONS

(71) Applicant: Amazon Technologies, Inc., Seattle, WA (US)

(72) Inventor: Ganesha Batta, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 17/199,187

(22) Filed: Mar. 11, 2021

(65) Prior Publication Data

US 2022/0295581 A1    Sep. 15, 2022

(51) Int. Cl.
| | |
|---|---|
| *H04W 4/00* | (2018.01) |
| *H04W 76/14* | (2018.01) |
| *H04W 4/80* | (2018.01) |
| *H04R 5/033* | (2006.01) |
| *H04W 8/00* | (2009.01) |
| *H04W 80/02* | (2009.01) |

(52) U.S. Cl.
CPC ............ *H04W 76/14* (2018.02); *H04R 5/033* (2013.01); *H04W 4/80* (2018.02); *H04W 8/005* (2013.01); *H04W 80/02* (2013.01); *H04R 2420/07* (2013.01)

(58) Field of Classification Search
CPC ....... H04W 76/14; H04W 8/005; H04W 4/80; H04W 80/02; H04W 8/00; H04R 5/033; H04R 2420/07
USPC .......................................................... 370/329
See application file for complete search history.

(56) References Cited

U.S. PATENT DOCUMENTS

| | | | |
|---|---|---|---|
| 9,913,079 B2 * | 3/2018 | Srivatsa ................ | H04L 67/104 |
| 10,271,209 B2 * | 4/2019 | Adler ................ | H04W 12/0471 |
| 10,419,912 B2 * | 9/2019 | Srivatsa ................ | H04W 12/04 |
| 10,986,482 B2 * | 4/2021 | Srivatsa ................. | H04W 4/08 |
| 2011/0215921 A1 * | 9/2011 | Ben Ayed ................ | G08B 1/08 340/539.11 |
| 2011/0293095 A1 * | 12/2011 | Ben Ayed ............ | H04W 12/50 455/26.1 |
| 2014/0094124 A1 * | 4/2014 | Dave ....................... | H04W 8/20 455/41.2 |
| 2014/0281470 A1 * | 9/2014 | Detter ............... | H04M 1/72454 713/100 |
| 2015/0080031 A1 * | 3/2015 | Moldavsky ........ | G06Q 30/0261 455/456.3 |
| 2016/0366538 A1 * | 12/2016 | Agarwal .......... | H04W 52/0258 |
| 2018/0063310 A1 * | 3/2018 | McGary ............ | H04M 1/72412 |
| 2018/0115858 A1 * | 4/2018 | Raghavendra ........ | H04W 4/026 |

(Continued)

*Primary Examiner* — Marceau Milord
(74) *Attorney, Agent, or Firm* — Lee & Hayes, P.C.

(57) ABSTRACT

The disclosure describes techniques for automatically pairing multiple source devices to a sink device in response to a single source device being paired to the source device. For instance, in response to a single source device being manually paired to wireless earbuds, the techniques may automatically pair other source devices that are associated with a common user account. In addition, this disclosure describes techniques for configuring a sink device to periodically broadcast advertisement messages indicating a current state of the sink device, which enables source devices that receive the advertisement message to determine whether to establish a connection with the sink device based on a current state of the sink device.

18 Claims, 22 Drawing Sheets

(56) References Cited

U.S. PATENT DOCUMENTS

| | | | |
|---|---|---|---|
| 2019/0150204 A1* | 5/2019 | Hintermeister | H04W 12/037 |
| | | | 455/411 |
| 2019/0174557 A1* | 6/2019 | Ueda | H04R 3/12 |
| 2019/0294712 A1* | 9/2019 | Haddon | H04W 4/12 |
| 2020/0394332 A1* | 12/2020 | Jakobsson | G06F 16/24573 |
| 2021/0037582 A1* | 2/2021 | Kim | H04R 5/033 |
| 2022/0295287 A1 | 9/2022 | Batta | |

* cited by examiner

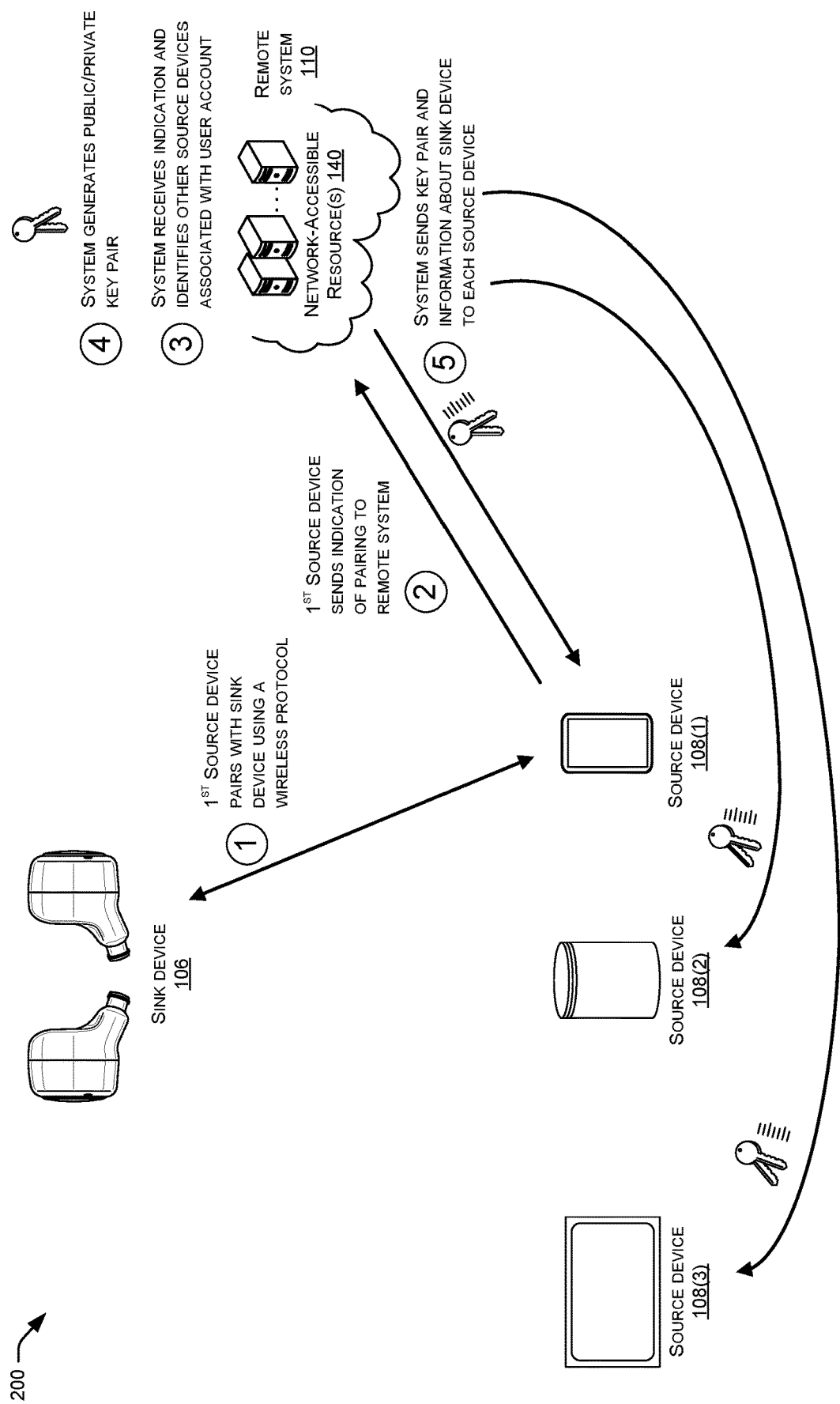

SOURCE DEVICE 108(2)

REMOTE SYSTEM 110

SOURCE DEVICE 108(1)

SINK DEVICE 106

NEGOTIATE CONNECTION DATA 624

NEGOTIATE CONNECTION DATA 624

6B

CONTEXT-BASED WIRELESS-PROTOCOL CONNECTIONS

BACKGROUND

As computing devices continue to evolve, the amount of computing devices used in everyday life continues to proliferate. Further, as the number of devices increases, so too does the interaction between these devices. For example, it is now commonplace for a user to use his or her wireless headphones to connect, over Bluetooth or another wireless protocol, to an array of devices over time. For instance, the user may use the wireless headphones to stream music from his or her phone in the morning, while later using the wireless headphones to stream audio from his or her laptop computer while at work later in the day. Similarly, users may connect an array of devices to one another using these wireless protocols. However, users often need to manually pair and connect two devices to enable these devices to communicate with one another.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A-B collectively illustrate a sequence of operations in which a first source device manually pairs to the hearable device of FIG. 1 and, in response, the remote pairing component generates a public/private key pair for use by each source device associated with an account of the user. The pairing component may then send the private/public key pair to the first source device and each other source device that is associated with a common account as the first source device. The first source device may then send the public/private key pair to the hearable device. At this point, each source device may be effectively paired with the hearable device and may use the public/private key pair for establishing at least an initial connection with the hearable device.

DETAILED DESCRIPTION

Figure 1:
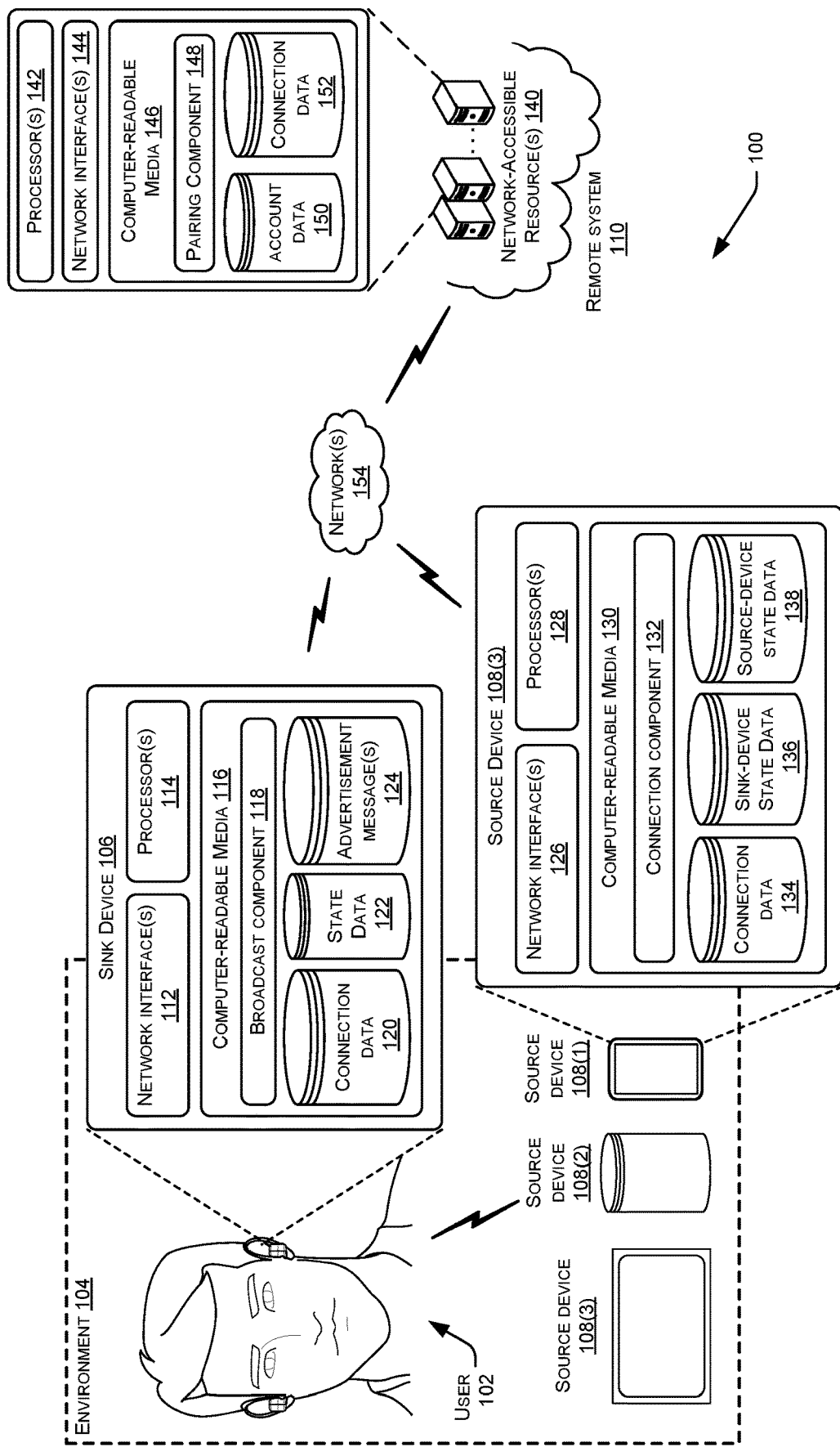
FIG. 1 illustrates a schematic diagram of an illustrative architecture in which a user is wearing an ear-based or "hearable" device configured to pair and connect with one or more source devices. In some instances, the user may manually pair a first source device to the hearable device and, in response, a remote pairing component may data, such as a public/private key pair, for enabling each source device of the user to connect to the hearable device, without requiring the user to manually pair each of these devices. Further, after these devices have been paired with the hearable device, these source devices may listen for and detect advertisement messages broadcasted by the hearable device to determine when each respective source device should establish a connection with the hearable device. During a first connection between a source device and the hearable device, these devices may use the received data, such as the private/public key pair, to negotiate new connection data (e.g., encryption keys) for securing subsequent connections.

The disclosure describes, in part, techniques for automatically pairing multiple electronic devices to a particular electronic device in response to a single electronic device being paired to the particular electronic device. For example, the particular electronic device may comprise an ear-based, hearable device (e.g., wireless earphones, earbuds, over-the-ear headphones, etc.), a loudspeaker device (e.g., a soundbar, a subwoofer, a portable speaker, etc.), a display device (e.g., a secondary display device, a monitor, etc.), or any other electronic device configured to pair and connect to other electronic devices over wireless protocols, such as Bluetooth, Zigbee, Zwave, or other personal area networks (PANs).

In some instances, the particular electronic device comprises a sink device that is configured to receive data from one or more source devices. For example, the sink device may comprise a hearable device (e.g., wireless earbuds, headphones, a car stereo, etc.) that is configured to pair and connect with a mobile phone, a smart television, a video-streaming device, a voice-controlled device, and/or the like to output audio content provided by source device. The hearable or ear-based device may comprise a wired or wireless earbud that fits in a user's ear, an ear-muff device that at least partially covers the ear of the user, or any other type of ear-based computing device that is worn on, or near, an ear of the user. In this example, a user may request to pair a first source device to the hearable device over a particular wireless protocol. For example, the user may operate the source device to place the source device in a "discoverable mode" and may operate the hearable device to place this device in a "pairing mode". After doing so, the hearable device wirelessly locates the source device and the devices "pair" with one another by exchanging certain information. Now that the devices are paired, they can quickly establish a connection over the wireless protocol.

As described herein, after pairing, one or both of the hearable device or the first source device may be configured to send an indication of the pairing to a system, such as a remote system residing outside the environment of the hearable device and the first source device. For example, the first source device may be configured to send, over a network and to the system, an identifier of the hearable device (e.g., MAC address), services supported by the hearable device (e.g., hands free profile (HFP), Advanced Audio Distribution Profile (A2DP), etc.), an identifier of the first source device, and/or the like.

Upon receiving this information from the first source device, a pairing component of the system may be configured to determine whether to automatically pair one or more additional source devices with the hearable device. For instance, the pairing component may first use the identifier of the source device and/or the identifier of the hearable device to determine whether one or both of these devices are currently registered to or otherwise associated with a user account or profile. If so, the pairing component may determine whether one or more additional source devices are also registered with or otherwise associated with the user account. For example, the pairing component may determine whether the user account is associated with one or more additional source devices configured to pair and connect with the hearable device (in this example), such as a mobile phone, a smart television or television plug-in component, a voice-controlled device, a tablet computing device, a laptop computing device, and/or any other type of electronic device.

Upon identifying one or more additional source devices associated with the user account, the pairing component may generate data to enable the first source device and the additional source devices to establish at least an initial respective connection with the hearable device or other sink device. For instance, the first source device may generate or otherwise acquire a public/private key pair key for use in establishing a secure connection between each source device and the hearable device over a wireless protocol. After generating the public/private key pair, the pairing component may send the public/private key pair to the first source device and to each additional identified source device. The first source device, or another source device, may then send the public/private key pair to the hearable device. In addition, the pairing component may send, to each additional source device, information regarding the hearable device associated with the public/private key pair, such as a MAC address of the hearable device, other identifying information associated with the hearable device, services offered or supported by the hearable device, and/or the like. Each source device may then store the public/private key pair in association with the information associated with the hearable device, and the hearable device may be listed in memory of each respective source device as a paired device. That is, each additional source device may store an indication that it has paired to the hearable device, even though each additional source device did not in fact manually pair to the hearable device.

After the first source device sends the public/private key pair to the hearable device, the first source device and the hearable device may use this public/private key pair to establish a connection. For instance, the hearable device may be configured to periodically generate and output an advertisement message indicating a current state of the hearable device (e.g., as described in detail below) and encrypted data, such as the public key of the key pair encrypted using the private key.

Each source device, meanwhile, may perform continuous or periodic wireless-protocol scans to detect such advertisement messages and, upon detecting this message, may first attempt to decrypt the encrypted data. For instance, the first source device may use a private key associated with each stored public/private key pair to determine whether it can successfully decrypt the data. In this instance, the first source device will successfully decrypt the encrypted data using the stored private key associated with the aforementioned key pair. Upon doing so, the first source device may establish a first connection with the hearable device using the wireless protocol, such as an Asynchronous Connection-Less (ACL) connection over Bluetooth. After establishing this connection, the first source device may send, to the hearable device, an encrypted ping message, such as Logical Link Control Adaptation Protocol (L2CAP) ping message that has been encrypted using the private key of the public/private key pair. Upon receiving this message, the hearable device may use the private key of the public/private key pair to decrypt the message. Upon decrypting this ping message, the hearable device may send a response message, such as an LCAP ping response message to the first source device.

Upon receiving this response message, the first source device may establish a secure connection (e.g., a secure profile connection over Bluetooth) with the hearable device using the private key of the public/private key pair. Upon establishing this secure connection, the first source device and the hearable device may negotiate additional connection data, such as new encryption keys, for establishing subsequent secure connections over the wireless protocol. For instance, these devices may be configured to use a shared secret to generate the new encryption keys, one of the devices may be configured to generate the new encryption keys and share it with the other device, or any other known key-generation and key-sharing techniques may be used.

Further, while the above process is described with reference to the first source device and the hearable device, each additional source device may perform the same or a similar process in order to generate and/or receive new, unique encryption keys for use in establishing subsequent secure connections with the hearable device. Further, after obtaining respective unique encryption keys, in some instances the source devices may then receive and analyze the subsequently broadcasted advertisement messages for determining whether to establish a connection with the hearable device, as described below. In addition, when a new source device is associated with the account that is associated with the hearable device, the pairing component may send, to the newly registered source device, the public/private key pair to enable the new source device to establish a connection with the hearable device for negotiating new encryption keys, as described above.

While the above example describes the pairing component of the remote system generating a public/private key pair in response to receiving an indication that the first source device has paired with the hearable device, in other instances the pairing component may generate respective data for both the first source device and each additional source device, with this data for later use by the respective device and the hearable device to establish a connection with one another. For instance, envision that the pairing component identified two additional source devices associated with the user account, referred to as a second source device and a third source device. The pairing component may generate first data for use by the first source device and the hearable device to establish a connection, second data for use by the second source device and the hearable device to establish a connection, and third data for use by the third source device and the hearable device to establish a connection.

The generated data may comprise information used to establish a connection over a particular wireless protocol. For instance, the data may comprise an encryption key (sometimes referred to as a "link key") to be used by both the hearable device and the respective source device to establish a connection or, in some instances, an encryption key that is used by these devices to generate an additional encryption key as described below. Thus, the first data generated by the pairing component may comprise a first encryption key, the second data may comprise a second encryption key, and the third data may comprise a third encryption key. The data may also include identification information (e.g., MAC address) of the hearable device and/or the respective source device. For instance, the first data may comprise an address of the hearable device and the second source device, and the third data may comprise an address of the hearable device and the third source device.

Upon generating this information, the pairing component may send the information to one or more of the source device(s), the hearable device, or another. For instance, the pairing component may send the first, second, and third data back to the hearable device, potentially routed through one or more other devices, and may send the each of the respective data to respective source device (again, potentially routed through one or more other devices). For instance, the pairing component may send the first, second, and third data to the first source along with an instruction to cause the first source device to send the first, second, and third data to the hearable device. In addition, the pairing component may send the second data to the second source device and the third data to the third source device. Of course, it is to be appreciated that the pairing component may route this information to these devices in any other manner, such as by instructing the first source device to send the second data to the second source device and the third data to the third source device, and so forth.

Upon receiving the first, second, and third data, the hearable device may store this information, such as in a local pairing table maintained at the hearable device. Now that the hearable device stores the first, second, and third data, and each source device has received and stored its respective data (e.g., the first source device having received the first data, the second source device having received the second data, and the third source device having received the third data), the hearable device and each source device are now paired with one another and able to establish a respective connection via the wireless protocol. Thus, the techniques described herein enable each of the three (or other number of source devices) to be paired to the hearable device (in this example) despite only the first source device being manually paired to the hearable device. Thus, at this point, the second source device may use the second data to establish a connection with the hearable device and the third source device may use the third data to establish a connection with the hearable device, despite neither device having been manually paired with the hearable device.

In addition to the above, the disclosure describes, in part, techniques for enabling the source devices paired to a sink device to determine whether and when to establish a connection with the sink device (e.g., after having established respective initial connections for negotiating respective unique encryption keys). In some instances, the sink device, such as the hearable device described above, may broadcast or otherwise output an advertisement message indicating a current state of the hearable device. For example, the hearable device may periodically determine its current state and generate and broadcast an advertisement message indicating this current state. In some instances, the current state may include an indication of a number of electronic devices to which the hearable device is currently connected to, a maximum number of electronic devices that the hearable device is capable of connecting to, whether the hearable device is currently being worn by a user (e.g., whether the hearable device is in or over the ear of a user), whether the hearable device is currently receiving and outputting audio, and/or the like. Further, while some examples herein are described with reference to a hearable device, such as wireless earbuds, in other instances the sink device may comprise an animatronic device configured to dance and/or lip-sync along to music being outputted or any other type of secondary electronic device.

The source devices, meanwhile, may be configured to continuously or periodically perform wireless-protocol scans to attempt to detect any such advertisement messages. In some instances, the source devices may attempt to detect advertisement messages from devices to which the source devices have previously paired with. As will be appreciated, the source devices that are proximate (e.g., in the environment of) the hearable device will receive the advertisement messages, while the sources that are not proximate the hearable device will not. Upon receiving an advertisement message, the respective source device may determine the current state of the hearable device from the advertisement message, and/or may determine its own state, to determine whether or not to establish a connection with the hearable device Given that the source device may already be paired with the hearable device, the respective source device may relatively quickly establish the connection with or without user input.

In some instances, each respective source device may determine whether the current state of the hearable device indicates that it is currently in use, such as being worn by a user (in the case of over-the-ear headphones), being in the ear of a user (in the case of the wireless earbuds), being proximate to a user (in the case of a wireless car stereo), and so forth. If the hearable device is not currently in use, then the source device may determine to refrain from establishing a connection with the hearable device.

If, however, the source device determines that the hearable device is currently in use, the source device may determine whether the current number of devices to which the hearable device is currently connected to the maximum number of devices to which the hearable device is able to connect. If not, then the source device may attempt to establish a connection with the hearable device. For instance, the source device may establish an Asynchronous Connectionless Link (ACL) connection and/or one or more profile connections, such as a Hands Free Profile (HFP) connection or the like. Further, the source device may determine whether the source device is currently outputting audio content and, thus, has audio content that it may provide to the hearable device. If so, then the source device may also begin streaming or otherwise sending the audio content to the hearable device and/or may output a query to the user regarding whether the user would like the hearable device to begin outputting the audio content from the source device. For instance, the source device may be configured to present the query on a display of the source device, audibly on the hearable device or source device, or the like.

If, however, the source device determines that the hearable device is currently connected to the maximum number of connections, then the source device may refrain from establishing a connection with the hearable device or may determine additional information before making the determination. For instance, the source device may determine information about its current state, such as whether the source device is currently outputting audio content, before determining whether to establish a connection and, effectively, take over one connection slot of the maximum available connections of the hearable device. If the source device determines that it is currently outputting audio content (or has audio content to output), the source device may establish the connection with the hearable device or may output a query regarding whether the user would like to establish the connection. In addition, the source device may begin sending the audio content to the hearable device and/or may cause a query to be outputted to a user regarding whether they would like the hearable device to output the audio content from the source device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative architecture 100 in which a user 102 in an environment 104 utilizes a sink device 106, such as an ear-based or "hearable" device, to receive and output content from one or more source devices 108(1), 108(2), and 108(3) (or "source device(s) 108"). While FIG. 1 illustrates three devices, it is to be appreciated that the sink device 106 may communicate with any other number of devices. Further, while some of the examples herein are described with reference to a hearable device, it is to be appreciated that the sink device 106 may comprise any other sort of device configured to receive and output any other kind of content, such as a device including a display to visually present content, and so forth.

In some instances, the sink device 106 may communicate with the source devices 108 via a wireless network, such as a short-range wireless network. The short-range wireless network may utilize any type of wireless protocol, such as Bluetooth, Zigbee, Zwave, and/or the like. In order to communicate with one or more of the source devices 108, the sink device 106 may first pair to one of the source devices. For instance, the illustrated sink device 106 may pair with the first source device 108(1). In response to these devices pairing, the first source device 108(1), the sink device 106, and/or another device may send an indication of the pairing to a remote system over one or more networks 154 (e.g., one or more wired and/or wireless wide area networks). This indication may include identification information of the sink device 106 (e.g., MAC address), identification information of the source device 108(1), capabilities or services offered by the sink device 106, capabilities or services offered by the source device 108(1), and/or the like.

Upon receiving this information, the remote system may use the identification information to identify a user account associated with one or both of the sink device 106 and/or the first source device 108(1). If the user account indicates that no other source devices are associated with the user account, then the remote system may generate data, such as a public/private key pair, for enabling the first source device 108(1) and the sink device 106 to communicate with one another over the wireless protocol and may send this data back to the first source device 108(1), the sink device 106, and/or another device. In some instances, the remote system 110 sends the public/private key pair to the first source device 108(1), along with instruction data to cause the first source device 108(1) to send the public/private key pair to the sink device.

The public/private key pair may be used as encryption keys for use by the first source device 108(1) and the sink device to communicate over the wireless protocol securely. For instance, the public/private key pair may be used to encrypt initial communications over the wireless protocol and thereafter negotiate new encryption key(s) (e.g., using a shared secret stored on both devices). In addition, the first data may further include identification information associated with the sink device 106, identification information associated with the source device 108(1), capabilities or services offered by one or both devices, and/or the like.

In some instances, meanwhile, the remote system 110 may determine that one or more additional source devices have been registered with the user account. In these instances, the remote system 110 may be configured to also send the public/private key pair to the additional source devices. In other instances, meanwhile, the remote system 110 may generate respective data for communicating with the sink device 106 for each additional source device. In this example, for instances, the remote system 110 may determine that the second source device 108(2) and the third source device 108(3) are associated with the same user account as the first source device 108(1) (and/or the sink device 106). In these instances, the remote system generate second data to enable the second source device 108(2) and the sink device to communicate with one another and third data to enable the third source device 108(2) and the sink device to communicate with one another. The second data may comprise a second encryption key and identification and capability information associated with the second source device 108(2) and the sink device 106, while the third data may comprise a third encryption key and identification and capability information associated with the third source device 108(3) and the sink device 106.

Upon generating the first, second, and third data (in this example), the remote system 110 may send this data back to one or more devices in the environment 104. For instance, the remote system 110 may send the first, second, and third data to the first source device 108(1) that initially paired with the sink device 106. The first source device 108(1) may then be programmed to send this information to the sink device 106, via the wireless protocol or otherwise. Upon receiving this data, the sink device may store the first, second, and third data in a local pairing table. Thus, from the perspective of the sink device 106, the sink device 106 may be paired with each of the first, second, and third source devices, despite only having been manually or directly paired with the first source device 108(1).

In addition, the remote system 110 may send, over the networks 154, the second data to the second source device 108(1) and the third data to the third source device 108(3). These devices may store this information in local memory such that these devices are now paired with the sink device 106 from the perspective of each respective source device.

Figure 3:
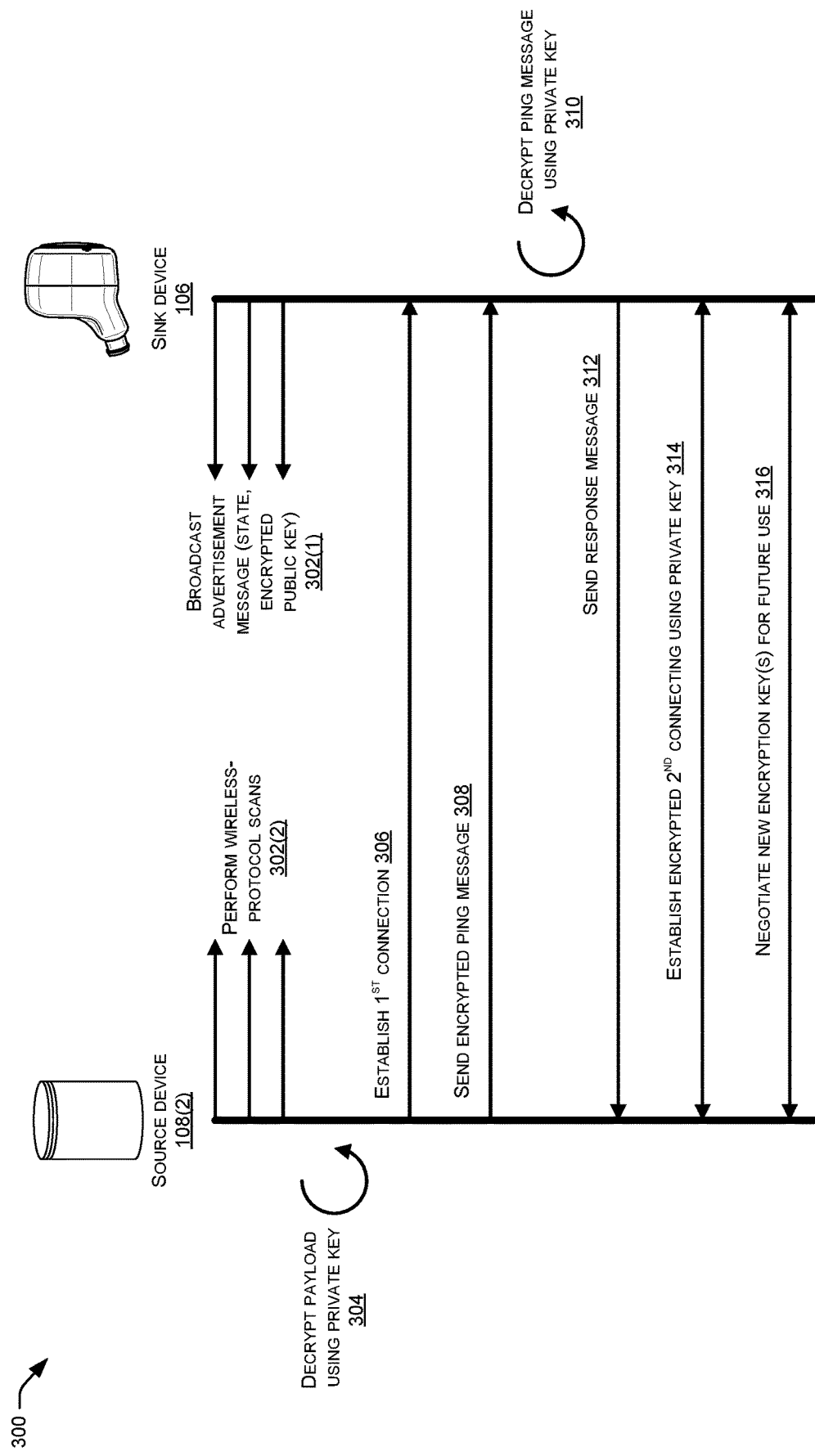
FIG. 3 illustrates a sequence of operations in which a source device detects an advertisement message broadcast by the hearable device and uses the public/private key pair it received from the pairing component to establish an initial connection with the hearable device. The source device and the hearable device then use the public/private key pair for negotiating additional connection data (e.g., encryption keys) for use in establishing subsequent secure connections.

In instances where the remote system 110 sends the same public/private key pair to each source device, each respective source device may use the public/private key pair for negotiating new, unique encryption key(s) for subsequent connections. FIG. 3, for instance, illustrates an example sequence of operations for doing so, and is described in detail below.

In addition, the sink device 106 may be configured to generate and transmit, over one or more wireless networks, periodic advertisement messages indicating a current state of the sink device 106. The source devices 108 that have paired with the sink device 106 and are in proximity of the sink device 106 may each receive these advertisement messages and determine whether to establish a connection with the sink device 106 based on the current state of the sink device 106 and/or the current state of the respective source device. Therefore, within the architecture 100, the decision regarding whether to establish a connection between a sink device and each source device may, in part, reside with the source devices, with these decisions being based on the respective proximities of the source devices to the sink device 106 and based on the states of the sink device 106 and/or each respective source device. Upon a source device determining to establishing a connection based on this information, the source device may automatically establish the connection.

As illustrated, the sink device 106 may include one or more network interfaces 112 (e.g., wired network interface, wireless network interface, etc.), one or more processors 114, and one or more computer-readable media 116. The network interfaces 112 may be configured to communicate over an array of wired and wireless networks and protocols, utilizing short-range wireless networks that utilize one or more wireless protocols. The computer-readable media 116 may store, in part, a broadcast component 118, connection data 120, state data 122, and advertisement messages 124.

Each source device, meanwhile, may include one or more network interfaces 126 (e.g., wired network interface, wireless network interface, etc.), one or more processors 128, and one or more computer-readable 130. The network interfaces 126 may be configured to communicate over an array of wired and wireless networks and protocols, utilizing short-range wireless networks that utilize one or more wireless protocols, as well as via wide area networks. The computer-readable media 130 may store, in part, a communication component 132, connection data 134, sink-device state data 136, and source-device state data 138.

Finally, the remote system 110 may comprise one or more network-accessible resources 140 comprising one or more server computing devices accessible over the networks 154. As illustrated, the network-accessible resources 140 may comprise one or more processors 142, one or more network interfaces 144 (e.g., wired network interface, wireless network interface, etc.), and one or more computer-readable media 146. The network interfaces 112 may be configured to communicate over an array of wired and wireless networks and protocols, including wide area networks. The computer-readable media 148 may store, in part, a paring component 148, account data 150, and connection data 152.

Within the architecture 100, an example first source device 108(1) may utilize its network interfaces 126 to pair via a wireless protocol with the sink device, which may utilize its network interfaces 112 to establish this pairing. Upon these devices being paired, the connection component 132 may be configured to send an indication of the pairing to the pairing component 148 stored on the remote system 110. As described above, this indication may include an indication of the pairing, a MAC address of the sink device 106, a MAC address of the source device 108(1), and capabilities of one or both devices.

Upon receiving this indication, the pairing component may use the MAC address of the sink device 106 and/or the MAC address (or other identifying information) of the first source device 108(1) to identify a user account associated with one or both of these devices. For instance, the pairing component may use this identification information as a key to search the account data 150 to identify the corresponding user account. Upon identifying the user account, the pairing component may determine, from the account data, whether this user account has been registered or otherwise associated with one or more additional source devices. In this example, the pairing component 148 may determine that the user account is associated with the second source device 108(2) and the third source device 108(3).

In addition, the pairing component 148 may be configured to: (i) generate a public/private key used by each source device to establish an initial secure communication between the respective source device and the sink device, or (ii) generate unique data for each of the source devices 108 to enable each source device to establish a connection with the sink device 106. In the latter instances, the pairing component 148 may generate first data to enable the first source device 108(1) to establish a connection with the sink device 106, second data to enable the second source device 108(2) to establish a connection with the sink device 106, and third data to enable the third source device 108(3) to establish a connection with the sink device 106. Each data may include a unique encryption key and, potentially, additional information, such as identification information (e.g., a MAC address) of the respective source device, identification information (e.g., a MAC address) of the sink device 106, capabilities or one or both devices, and/or the like. The public/private key pair and/or the first data, the second data, and the third data may be stored as the illustrated connection data 152 at the remote system 110.

Upon generating this data, the pairing component 148 may send the public/private key pair to each source deice, each of which may store this public/private key pair as the connection data 134. The first source device, or another source device, may then send the pubic/private key pair to the sink device 104, which may store this key pair as the connection data 120.

In instances where the pairing component 148 generates unique data for each source device, meanwhile, the pairing component 148 may send the first data, the second data, and the third data to the first source device 108(1). The first source device may receive this data (e.g., via a wide area network) and send it to the sink device (e.g., via a personal area network utilizing the wireless protocol). In addition, the first source device 108(1) may store the first data as the connection data 134 to enable the first source device 108(1) to later establish a secure communication channel with the sink device 106 via the wireless protocol. The sink device 106, meanwhile, may store the first data, the second data, and the third data as the connection data 120, such as in a locally maintained pairing table. The sink device 106 may then use this connection data 120 as needed when establishing wireless-protocol communication channels with one or more source devices 108.

In addition to send the first, second, and third data to the first source device 108(1), the pairing component 148 may send the second and third data, respectively, to their respective source devices. For instances, the pairing component 148 may send, over the networks 154, the second data to the second source device 108(2) and the third data to the third source device 108(3). Each source device may store this data as local connection data for later establishing a wireless-protocol connection with the sink device 106.

The broadcast component 118 of the sink device 106, meanwhile, may periodically generate and broadcast advertisement messages over one or more wireless networks and using one or more wireless protocols. For instance, the broadcast component 118 may maintain state data 122 indicating a current and/or past state of the sink device 106. For instance, the state data 122 may indicate, for a current time and/or one or more past times, information such as a number of source devices to which the sink device 106 is currently connected to, a maximum number of source devices that the sink device 106 is capable of connecting to, whether the sink device 106 is currently in use (e.g., being worn by or otherwise in proximity to a user), whether the sink device 106 is currently receiving and outputting audio, and/or the like. The maximum number of source devices refers to maximum number of concurrent connections that the sink device 106 can support with source devices.

Periodically, the broadcast component 118 may determine its current state by accessing the state data 122 and generate an advertisement message, represented as advertisement message(s) 124. The broadcast component 118 may then broadcast or otherwise wirelessly output this advertisement message.

The respective connection component 132 of each source device, meanwhile, may be configured to continuously or periodically perform a scan of the wireless protocol to attempt to detect any such advertisement messages. Upon detecting such an advertisement message, the connection component 132 may identify the sink device 106 that sent the advertisement message, determine the current state of the sink device 106 as indicated by the advertisement message, and store this data as sink-device state data 136. In addition, each source device may maintain its own current and/or past state data 138, such as whether the respective source device is currently outputting audio content, and/or the like.

Upon receiving an advertisement message and determining the state data of the sink device 106, each source device that received the message may determine whether or not to establish a connection with the sink device 106. For instance, the communication component 132 may be configured to make this determination with reference to the current state of the sink device 106 and/or the current state of the source device. In some instances, each respective source device may determine whether the current state of the sink device 106 indicates that it is currently in use, such as being worn by or in proximity of a user. If the sink device 106 is not currently in use, then the source device may determine to refrain from establishing a connection with the sink device 106.

If, however, the source device determines that the sink device 106 is currently in use, the source device may determine whether the current number of devices to which the sink device 106 is currently connected to the maximum number of devices to which the sink device 106 is able to connect. If not, then the source device may attempt to establish a connection with the sink device 106. For instance, the source device may establish an Asynchronous Connectionless Link (ACL) connection and/or one or more profile connections, such as a Hands Free Profile (HFP) connection or the like. Further, the source device may determine whether the source device is currently outputting content (e.g., audio content, video content, etc.) and, thus, has content that it may provide to the sink device 106. If so, then the source device may also begin streaming or otherwise sending the content to the sink device 106 and/or may output a query to the user regarding whether the user would like the sink device 106 to begin outputting the content from the source device. For instance, the source device may be configured to present the query audibly or visually on the source device and/or the sink device 106 device.

If, however, the source device determines that the sink device 106 is currently connected to the maximum number of connections, then the source device may refrain from establishing a connection with the sink device 106 or may determine additional information before making the determination. For instance, the source device may determine information about its current state, such as whether the source device is currently outputting content, before determining whether to establish a connection and, effectively, take over one connection slot of the maximum available connections of the sink device 106. If the source device determines that it is currently outputting content (or has content to output), the source device may establish the connection with the sink device 106 or may output a query regarding whether the user would like to establish the connection. In addition, the source device may begin sending the content to the sink device 106 and/or may cause a query to be outputted to a user regarding whether they would like the sink device 106 to output the content from the source device. Thus, using the techniques described with reference to the architecture 100, the source devices 108 may be configured to determine whether to establish connections with the sink device 106 based not only on a proximity of the respective source device to the sink device 106, but also based on a state of the sink device 106 and/or a state of the source device.

It is to be appreciated that the network(s) 154 which connect the sink device 106 to the remote system 110 may represent an array or wired networks, wireless networks (e.g., WiFi), or combinations thereof. The remote system 110 may generally refer to a network-accessible system—or "cloud-based system"—implemented as a computing infrastructure of processors, storage, software, data access, and so forth that is maintained and accessible via the network(s) 154, such as the Internet. Cloud-based systems may not require end-user knowledge of the physical location and configuration of the system that delivers the services. As illustrated, the remote system 110 may comprise the network-accessible resource(s) 140, such as servers. Multiple of such resources 140 may be included in the system 110. As used herein, each of the one or more processors 114, 128, and 142 may include a central processing unit (CPU) for processing data and computer-readable instructions, and computer-readable storage media 116, 130 and 146 may store computer-readable instructions that are executable on the respective processor(s). While not illustrated, the computer-readable media 116, 130, and/or 146 may individually include volatile random access memory (RAM), non-volatile read only memory (ROM), non-volatile magnetoresistive (MRAM) and/or other types of memory. While not illustrated, the computer-readable media 116, 130, and/or 146 may individually include store one or more speech-recognition component(s), such as an automatic speech-recognition (ASR) component or system and a natural-language-understanding (NLU) component or system.

Figure 2B:
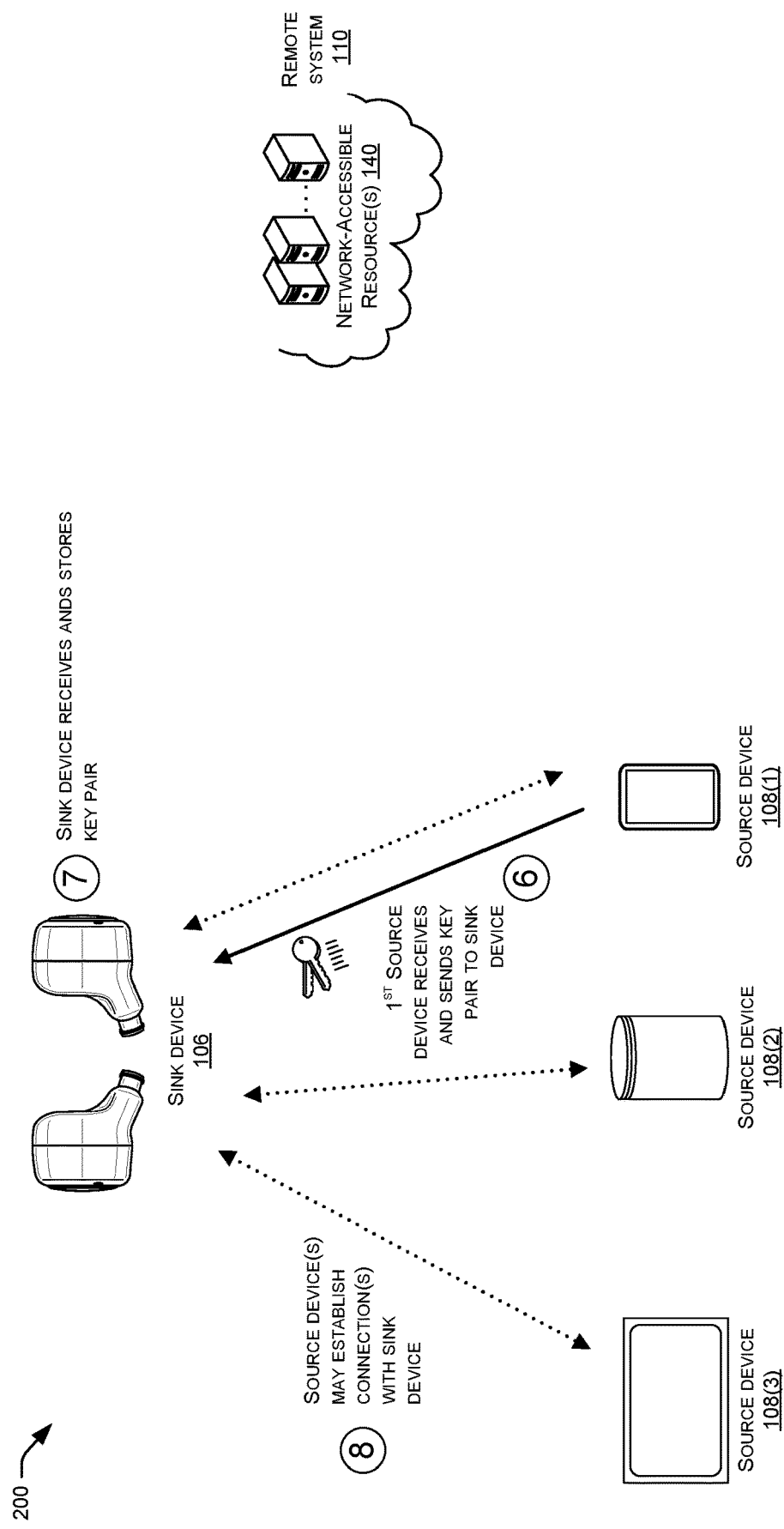

FIGS. 2A-B collectively illustrate a sequence of operations 200 in which a first source device 108(1) manually pairs to the sink device 106 and, in response, the remote pairing component 148 generates a public/private key pair for use by each source device associated with an account of the user. The pairing component 148 may then send the private/public key pair to the first source device 108(1) and each other source device that is associated with a common account as the first source device 108(1). The first source device 108(1) may then send the public/private key pair to the sink device 106. At this point, each source device 108 may be effectively paired with the sink device 106 and may use the public/private key pair for establishing at least an initial connection with the sink device 106. In some instances, each source device uses this initial connection to negotiate new encryption keys, such as by using the example process described below with reference to FIG. 3.

While the example sequence of operations 200 is described with reference to the sink device 106, it is to be appreciate that the remote-pairing techniques may be performed using any type of accessory or other electronic device. For instance, while this figure illustrates that the source devices may pair to an in-ear device, in other instances the techniques may be used to pair any sort of electronic device to any other electronic device, such as laptop computers, smart speakers, animatronic figures, wall clocks, wearable devices, smart televisions, smart appliances (e.g. lights, household appliances, etc.), and/or the like. Further, it is to be appreciated that the techniques shown in the sequence of operations 200 may be used to remotely pair new devices (e.g., source devices) that are added to a common user account. For instance, upon a new source device being registered to the user account that is registered with the illustrated source devices in FIG. 2A, the remote system 110 may send the generated connection information (e.g., public/private key pair) to the newly added device such that the newly added device is automatically paired to the sink device upon registration of the newly added device to the user account.

FIG. 2A illustrates, at "1", the first source device 108(1) pairing with the sink device 106 over a wireless protocol, such as Bluetooth. In some instances, this operation includes the first source device being placed in a "discoverable mode" and the sink device 106 being placed in a pairing mode. After doing so, the sink device 106 may wirelessly locate the first source device 108 and these devices "pair" with one another by exchanging certain information. Now that the devices are paired, they can quickly establish a connection over the wireless protocol.

At "2", and in response to the pairing, the first source device 108(1) sends an indication of the pairing to the remote system 110. This indication may include information such as identifying information of the sink device 106 and the first source device 108(1), capabilities of one or both devices, and so forth.

At "3", the remote system 110 receives the indication and identifies one or more other source devices associated with a common user account as the sink device 106 or the first source device 108(1) (or both). To do so, the remote system 110 may use the identifying information received at the operation "1".

At "4", the remote system 110 generates connection data (e.g., a public/private key pair) for use by the sink device 106 and each source device associated with the user account. In this example, the remote system 110 may determine that the account associated with the first source device 108(1) and/or the sink device is also associated with the second source device 108(2) and the third source device 108(3).

At "5", the remote system 110 may send the public/private key pair to each of the source devices 108(1)-(3). In addition, the remote system 110 may send information regarding the sink device 106 to at least the second source device 108(2) and the third source device 108(3). This information may comprise identifying information associated with the sink device (e.g., a MAC address), service(s) supported by the sink device 106, and/or the like. Each source device may store this received data as connection data for establishing a connection with the sink device 106.

FIG. 2B continues the illustration of the sequence of operations and includes, at "6", the first source device 108(1) sending (e.g., via the wireless protocol) the connection data (e.g., the public/private key pair) to the sink device 106. It is to be appreciated that while FIGS. 2A-B describe one example manner in which the connection data reaches the sink device 106, the first source device 108(1), the second source device 108(2), and the third source device 108(3), the routing of this data to reach these end devices may occur in multiple other manners.

At "7", the sink device 106 receives the public/private key pair and stores this data as connection data. As described above, this may include storing this information in a pairing table such that from the perspective of the sink device 106, the sink device 106 is currently paired to all three source devices.

At "9", the source devices may establish one or more connections with the sink device 106 over the wireless protocol, potentially based on proximity of the respective source devices to the sink device 106 and based on context. For instance, these source devices 108 may be configured to determine whether to establish a connection to the sink device 106 based on a current state of the sink device 106 and/or a current state of the respective source device, as described both above and below. Further, in some instances, the first respective connection between each source device and the sink device 106 may be for negotiating a unique encryption key(s), as described immediately below with reference to FIG. 3.

FIG. 3 illustrates a sequence of operations 300 in which example source device 108(2) detects an advertisement message broadcast by the sink device 106 and uses the public/private key pair it received from the pairing component 148 to establish an initial connection with the sink device 106. The source device 108(2) and the sink device 106 then use the public/private key pair for negotiating additional connection data (e.g., encryption keys) for use in establishing subsequent secure connections.

At an operation 302(1), the sink device 106 broadcasts an advertisement message that includes the public key of the key pair encrypted by the private key of the key pair, as well as indicating a current state of the sink device 106. At an operation 302(2), the example source device 108(2) (which has received the public/private key pair as shown in FIG. 2) performs wireless-protocol scans and, thus, detects the advertisement message.

Upon receiving the advertisement message, the source device 108(2) uses each public/private key pair stored in its connection data 134 to attempt to decrypt the encrypted public key included as part of the advertisement message. In this example, at an operation 304 the source device 108(2) successfully decrypts the encrypted public key using the private key of the key pair.

At an operation 306, and in response to decrypting this message, the source device 108(2) may determine that it has not yet established an initial connection with the sink device 106 and, thus, establishes a first connection with the sink device 106. In some instances, this first connection comprises an ACL connection over Bluetooth.

Thereafter, at an operation 308, the source device 108(2) sends an encrypted message over the established connection. For instance, the source device 108(2) may generate an L2CAP message, encrypt this message using the private key of the key pair, and send this encrypted L2CAP message to the sink device 106.

At an operation 310, sink device decrypts the received message using its copy of the private key and, at an operation 312, sends a response message to the source device 108(2). For instance, the sink device 106 may send an L2CAP ping response message to the source device 108(2). The source device 108(2) and the sink device 106 may then establish a second, encrypted connection at an operation 314, such as a profile connection that is encrypted using the private key at. At an operation 316, the source device 108(2) and/or the sink device 106 may generate new encryption keys for establishing subsequent encrypted connections and may store these respective encryption keys in respective locate storage. In some instances, these devices negotiate new encryption keys using a shared secret, while in other instances one of the devices may be configured to generate and share the new encryption keys.

Figure 4A:
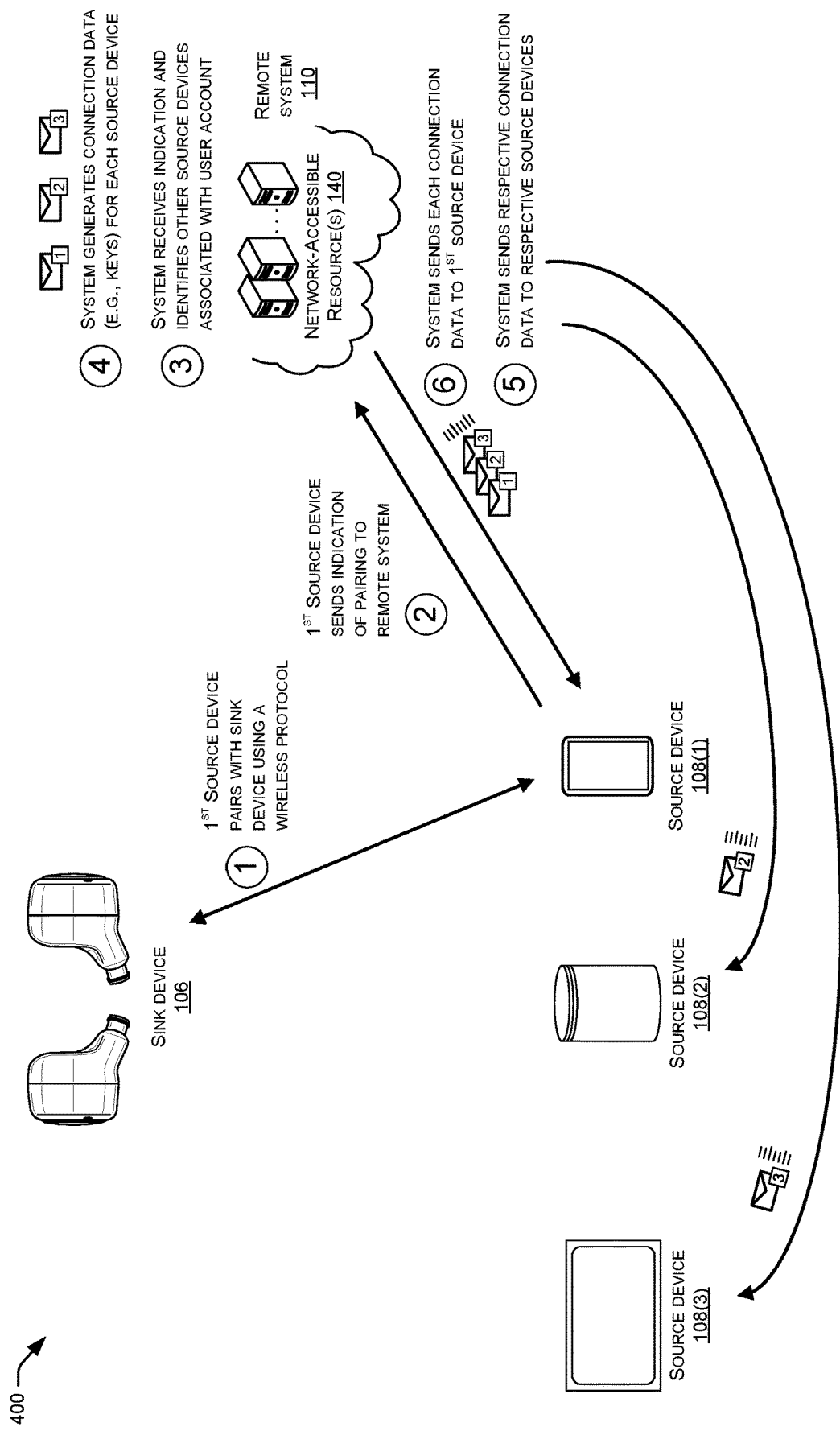
FIGS. 4A-B collectively illustrate a sequence of operations in which a first source device manually pairs to the hearable device of FIG. 1 and, in response, the remote pairing component generates respective pieces of data, which may include respective encryption keys, for use by each source device associated with an account of the user. The pairing component may send each piece of data to the hearable device to enable the hearable device to add these source devices and their respective encryption keys to its local storage, and may send the respective pieces of data to the source devices. By doing so, the sequence of operations may result in each source device associated with the account of the user being paired to the hearable device, despite only the first source device having been manually paired.
Figure 4B:
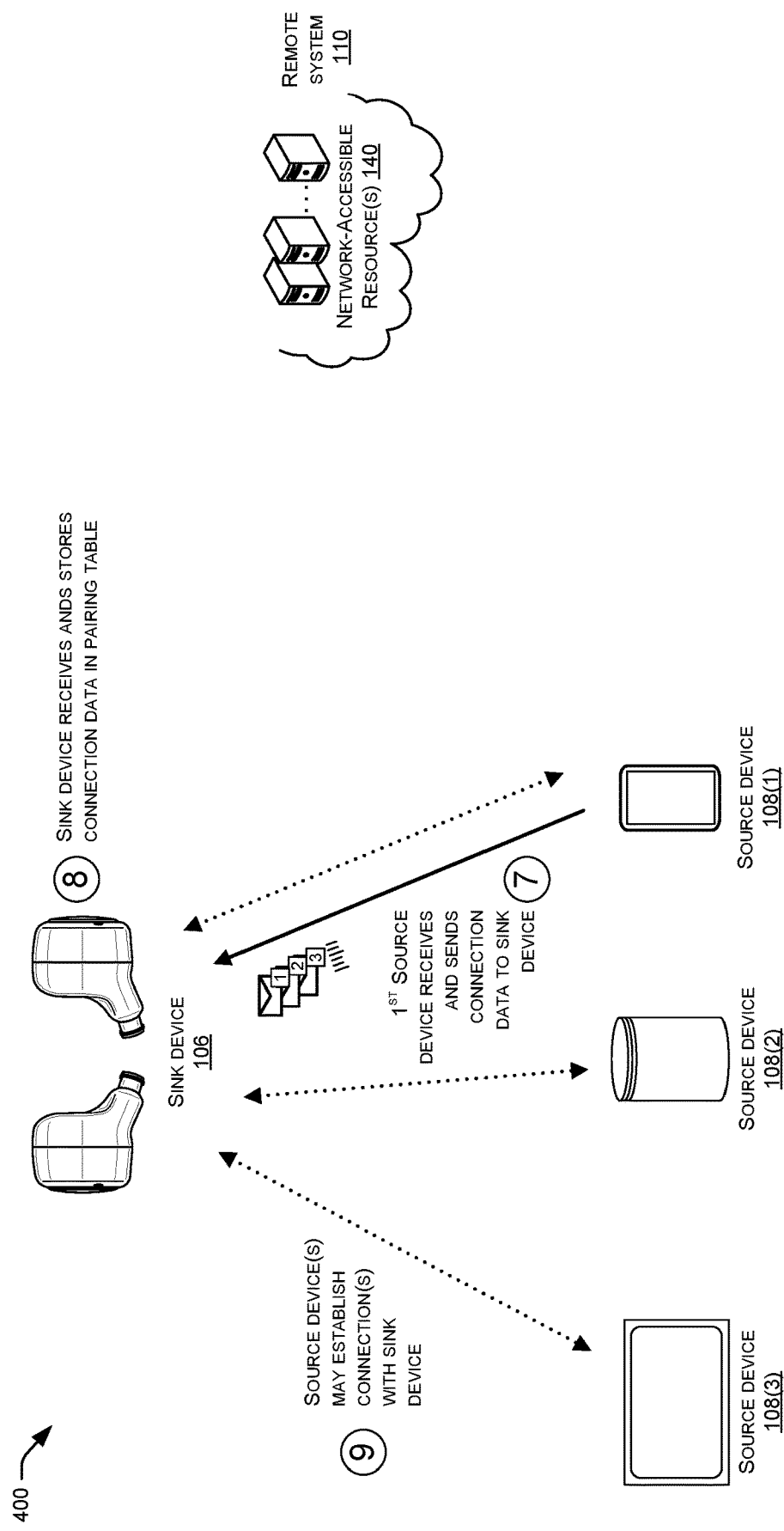

FIGS. 4A-B collectively illustrate a sequence of operations 400 in which a first source device 108(1) manually pairs to the sink device 106 and, in response, the remote pairing component 148 generates respective pieces of data, which may include respective encryption keys, for use by each source device 108 associated with an account of the user. The pairing component may send each piece of data to the sink device 106 to enable the sink device 106 to add these source devices and their respective encryption keys to its local storage, and may send the respective pieces of data to the source devices. By doing so, the sequence of operations 200 may result in each source device associated with the account of the user being paired to the sink device 106, despite only the first source device 108(1) having been manually paired.

At "1", the first source device is paired with the sink device 106 over a wireless protocol, such as Bluetooth. In some instances, this operation includes the first source device being placed in a "discoverable mode" and the sink device 106 being placed in a pairing mode. After doing so, the sink device 106 may wirelessly locate the first source device 108 and these devices "pair" with one another by exchanging certain information. Now that the devices are paired, they can quickly establish a connection over the wireless protocol.

At "2", and in response to the pairing, the first source device 108(1) sends an indication of the pairing to the remote system 110. This indication may include information such as identifying information of the sink device 106 and the first source device 108(1), capabilities of one or both devices, and so forth.

At "3", the remote system 110 receives the indication and identifies one or more other source devices associated with a common user account as the sink device 106 or the first source device 108(1) (or both). To do so, the remote system 110 may use the identifying information received at the operation "1".

At "4", the remote system 110 generates connection data for each combination of the sink device 106 and a respective source device associated with the user account. For instance, if the remote system 110 determines that the only source device that is associated with the user account is the first source device 108(1), then the remote system generates first data for enabling a connection between the first source device 108(1) and the sink device 106. In this instance, however, the remote system 110 determines that the second source device 108(2) and the third source device 108(3) are also associated with the common user account and, thus, the remote system 110 generates second and third data as well, for enabling the second source device 108(2) to connect with the sink device 106 and the third source device 108(3) to connect with the sink device 106, respectively. As described above, each piece of data may include an encryption key, identification information for the source device and/or the sink device 106, capability information for the source device and/or the sink device 106, and so forth.

At "5", the remote system 110 may send each respective piece of data to a respective source device. For instance, the system 110 may send the second data to the second source device 108(2) and the third data to the third source device 108(3). Each source device may store this received data as connection data for establishing a connection with the sink device 106.

At "6", the remote system 110 sends each of the first, second, and third data to the first source device 108(1) that sent the initial indication of the pairing at the operation "1". The first source device 108(1) may store the first data as connection data (for establishing a connection with the sink device 106).

FIG. 4B continues the illustration of the sequence of operations and includes, at "7", the first source device 108(1) sending (e.g., via the wireless protocol) the first, second, and third data to the sink device 106. It is to be appreciated that while FIGS. 4A-B describe one example manner in which the first, second, and third reach the sink device 106, the first data reaches the first source device 108(1), the second data reaches the second source device 108(2), and the third data reaches the third source device 108(3), the routing of this data to reach these end devices may occur in multiple other manners.

At "8", the sink device 106 receives the first, second, and third data and stores this data as connection data. As described above, this may include storing this information in a pairing table such that from the perspective of the sink device 106, the sink device 106 is currently paired to all three source devices.

At "9", the source devices may establish one or more connections with the sink device 106 over the wireless protocol, potentially based on proximity of the respective source devices to the sink device 106 and based on context. For instance, these source devices 108 may be configured to determine whether to establish a connection to the sink device 106 based on a current state of the sink device 106 and/or a current state of the respective source device, as described both above and below.

Figure 5:
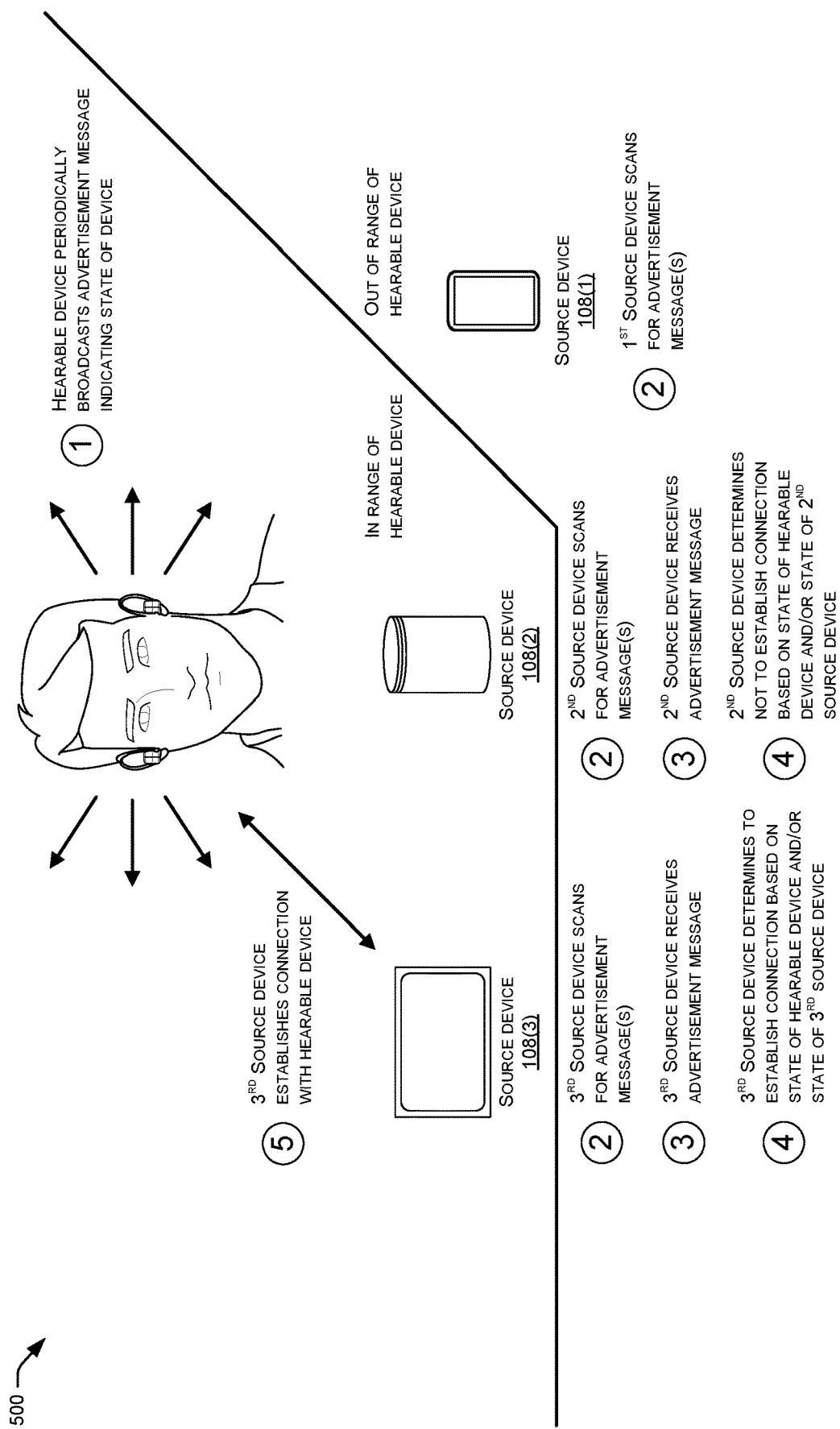
FIG. 5 illustrates a sequence of operations in which one or more of the source devices determine when to establish a connection with the hearable device after having been paired with the hearable device. As illustrated, the hearable device may periodically broadcast an advertisement message indicating a current state of the hearable device, such as a number of current connections between the hearable device and another device, a maximum number of connections the hearable device is capable of maintaining, whether the hearable device is currently in use (e.g., being worn by a user), whether the hearable device is currently receiving and outputting audio data, and so forth. Each source device that detects this broadcast message may determine, based on the state of the hearable device and/or its own current state, whether to establish a connection with the hearable device.

FIG. 5, for instance illustrates a sequence of operations 500 in which one or more of the source devices 108 determine when to establish a connection with the sink device 106 after having been paired with the sink device 106. In some instances, the sequence of operations may be used to establish an initial connection, during which time the respective source device 108 and the sink device 106 may negotiate new encryption keys. In other instances, the source devices 108 may immediately establish these respective initial connections upon receiving a respective advertisement, in which case the sequence of operations 500 may occur after each source device has established a respective initial connection and has stored new encryption keys for use in subsequent connections with the sink device 106.

At "1", the sink device 106 may periodically broadcast an advertisement message indicating a current state of the sink device 106. As described above, this current state may include a number of source devices to which the sink device 106 is currently connected to, a maximum number of source devices that the sink device 106 is capable of connecting to, whether the sink device 106 is currently in use (e.g., being worn by or otherwise in proximity to a user), whether the sink device 106 is currently receiving and outputting content (e.g. audio, video, etc.), and/or the like.

At "2", each of the first, second, and third source devices attempt to detect such advertisement messages by performing a scan using the wireless protocol. In this example, the first source device 108(1) does not detect the advertisement message, given that the first source device 108(1) is currently out of range of the sink device 106 as it pertains to the wireless protocol. At "3", however, the second and third source devices receive the broadcasted advertisement message given that they are each in range and of the sink device 106.

At "4", the first and second source devices (i.e., the source devices that received the advertisement message) determine whether or not to establish a connection with the sink device 106 based at least in part on the advertisement message. For instance, these devices may determine a current state of the sink device 106, as well as their own state, to determine whether or not to establish the respective connection. In this example, the third source device 108(3) determines to establish a connection, while the second source device 108(2) determines to refrain from establishing the connection. At "5", the third source device 108(3) establishes the connection via the wireless protocol.

Figure 6A:
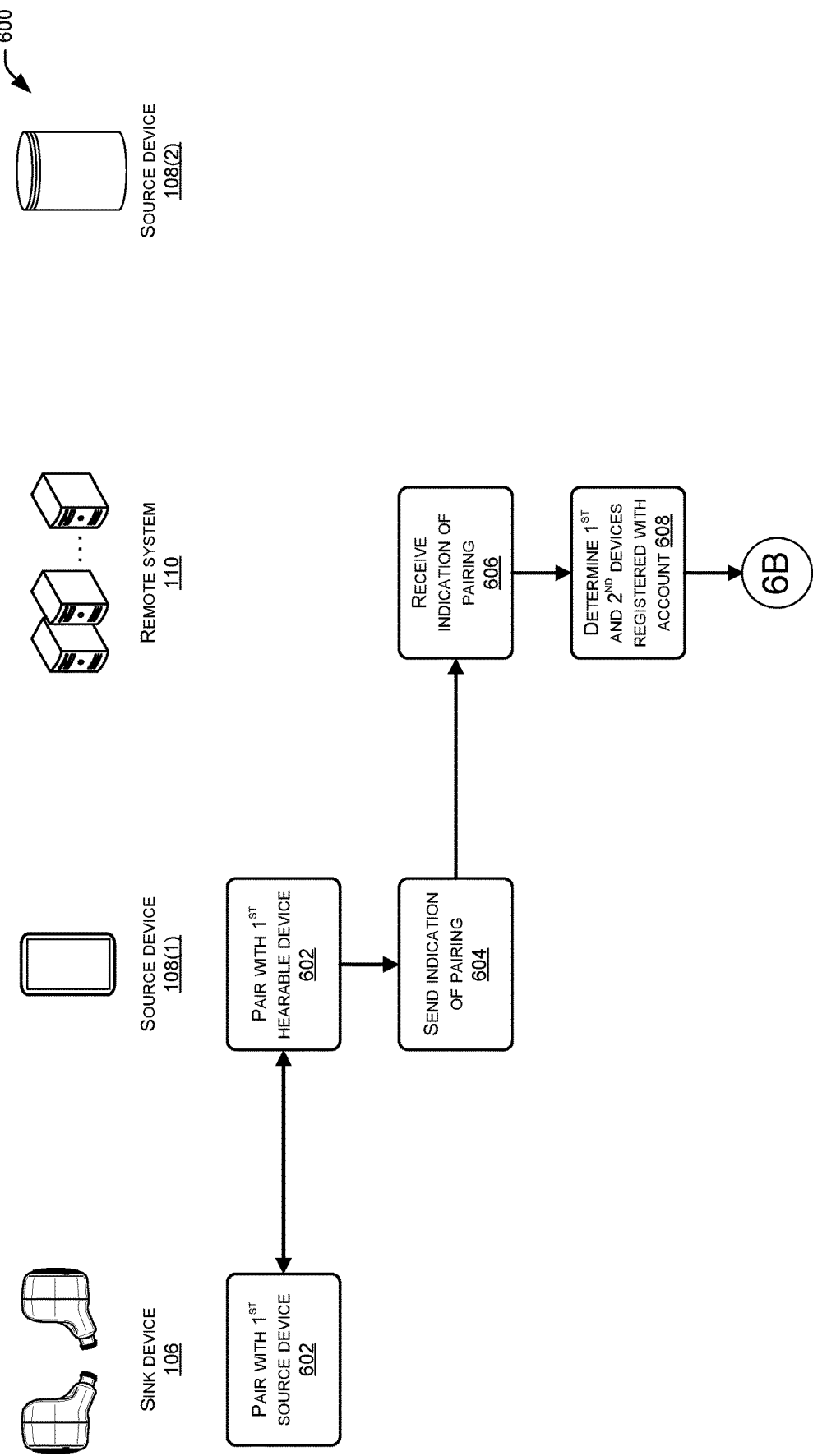
FIGS. 6A-C collectively illustrate a flow diagram of an example process in which a first source device pairs to a hearable device and, in response, a remote system generates a public/private key pair to enable the first source device, and each other source device associated with the first source device, to establish a secure connection with the hearable device. In some instances, the respective source devices use this public/private key pair to establish an initial connection, during which the respective source device and the hearable device negotiate additional connection data for establishing subsequent secure communications.
Figure 6B:
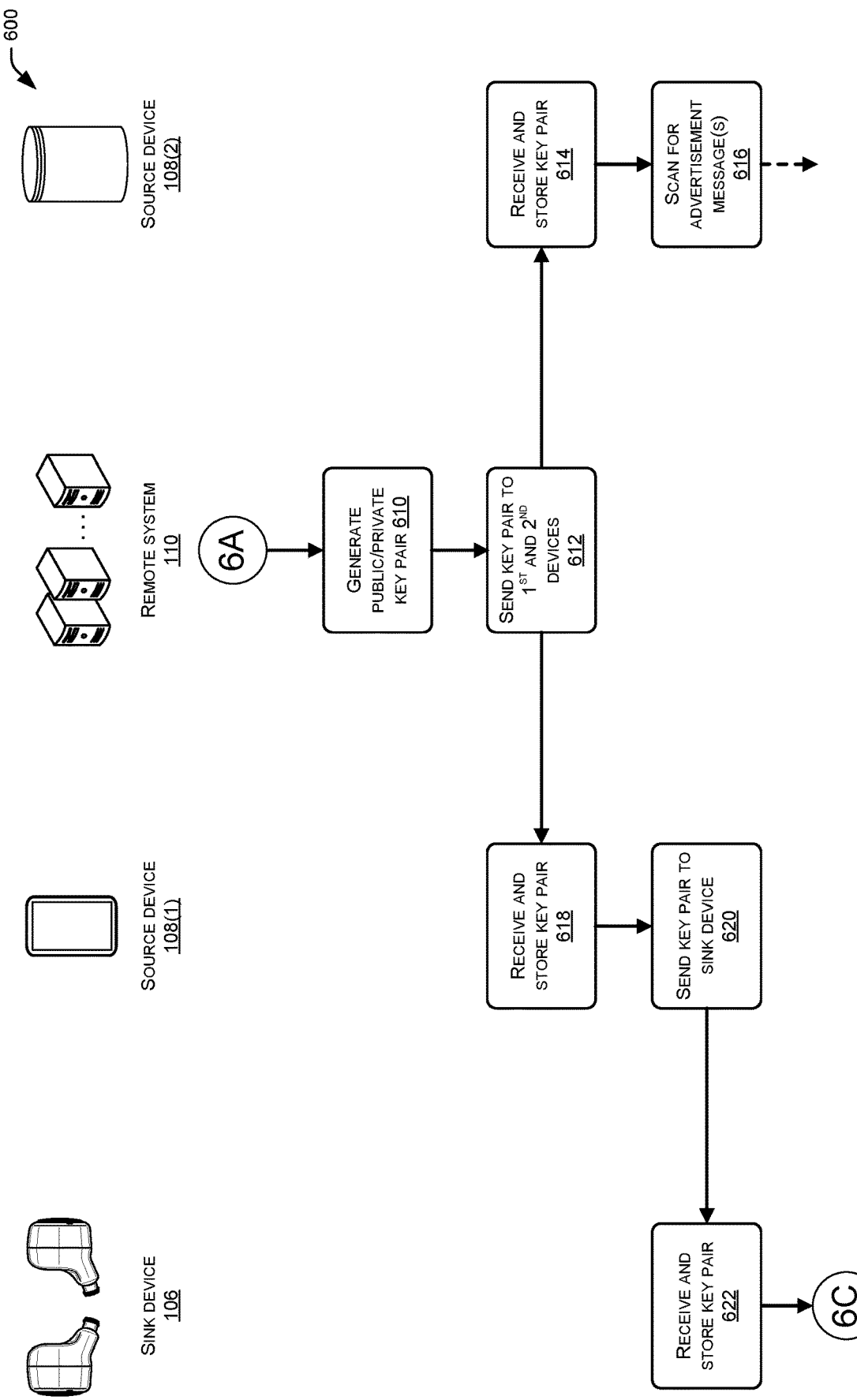
Figure 6C:
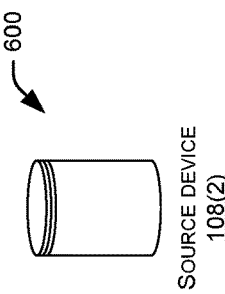
Figure 6C:
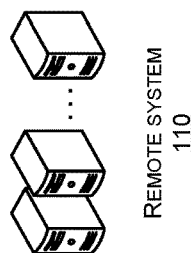
Figure 6C:
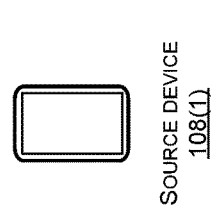
Figure 6C:
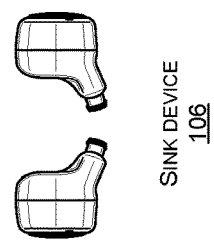
Figure 6C:
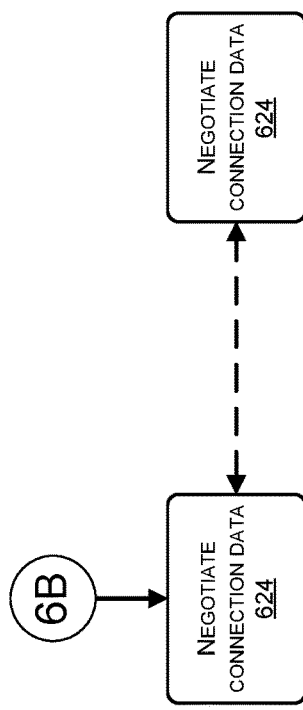

FIGS. 6A-C collectively illustrate a flow diagram of an example process 600 in which a first source device pairs to a sink device and, in response, a remote system generates a public/private key pair to enable the first source device, and each other source device associated with the first source device, to establish a secure connection with the hearable device. In some instances, the respective source devices use this public/private key pair to establish an initial connection, during which the respective source device and the hearable device negotiate additional connection data for establishing subsequent secure communications. The process 600, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Finally, while some of the operations are described as being performed by certain devices or components in these examples, it is to be appreciated that other devices and components may perform some or all of these operations in other instances.

At an operation 602, the example sink device 106 and the example first source device 108(1) pair with one another using a wireless protocol, such as Bluetooth. At an operation 604, the first source device sends an indication of the pairing to the remote system 110, which receives this indication at an operation 606. At an operation 408, the remote system 110 determines that both the first source device 108(1) and a second source device 108(2) are associated with a common user account.

FIG. 6B continues the illustration and includes, at an operation 610, the remote system 110 generating connection data in for the form of a public/private key pair for enabling the respective source devices to connect to the sink device 106 via the wireless protocol. At an operation 612, the remote system sends the connection data (e.g., public/private key pair) over one or more networks to the first source device 108(1) and the second source device 108(2). In some instances, the remote system 110 also sends information associated with the sink device 106 to the second source device 108(2), such as a MAC address of the sink device 106, services supported by the sink device 106, and so forth. At an operation 614, the second source device 108(2) receives the connection data (e.g., public/private key pair), stores this data, and may begin scanning for advertisement messages from the sink device 106. Upon detecting such an advertisement message, the second source device may perform the sequence of operations 300 described above with reference to FIG. 3.

At an operation 618, the first source device 108(1) receives and stores the connection data (e.g., public/private key pair). At an operation 620, the first source device 108(1) sends the connection data (e.g., public/private key pair) to the sink device 106 to the sink device 106, which receives and stores the data at an operation 622.

FIG. 6C concludes the illustration of the process 600 and includes, at an operation 624, the first source device 108(1) and the sink device 106 establishing a connection to negotiate additional connection data, such as new encryption key(s), for use in subsequent connections. For instance, this operation may comprise some or all of the sequence of operations 300 described above with reference to FIG. 3.

Figure 7A:
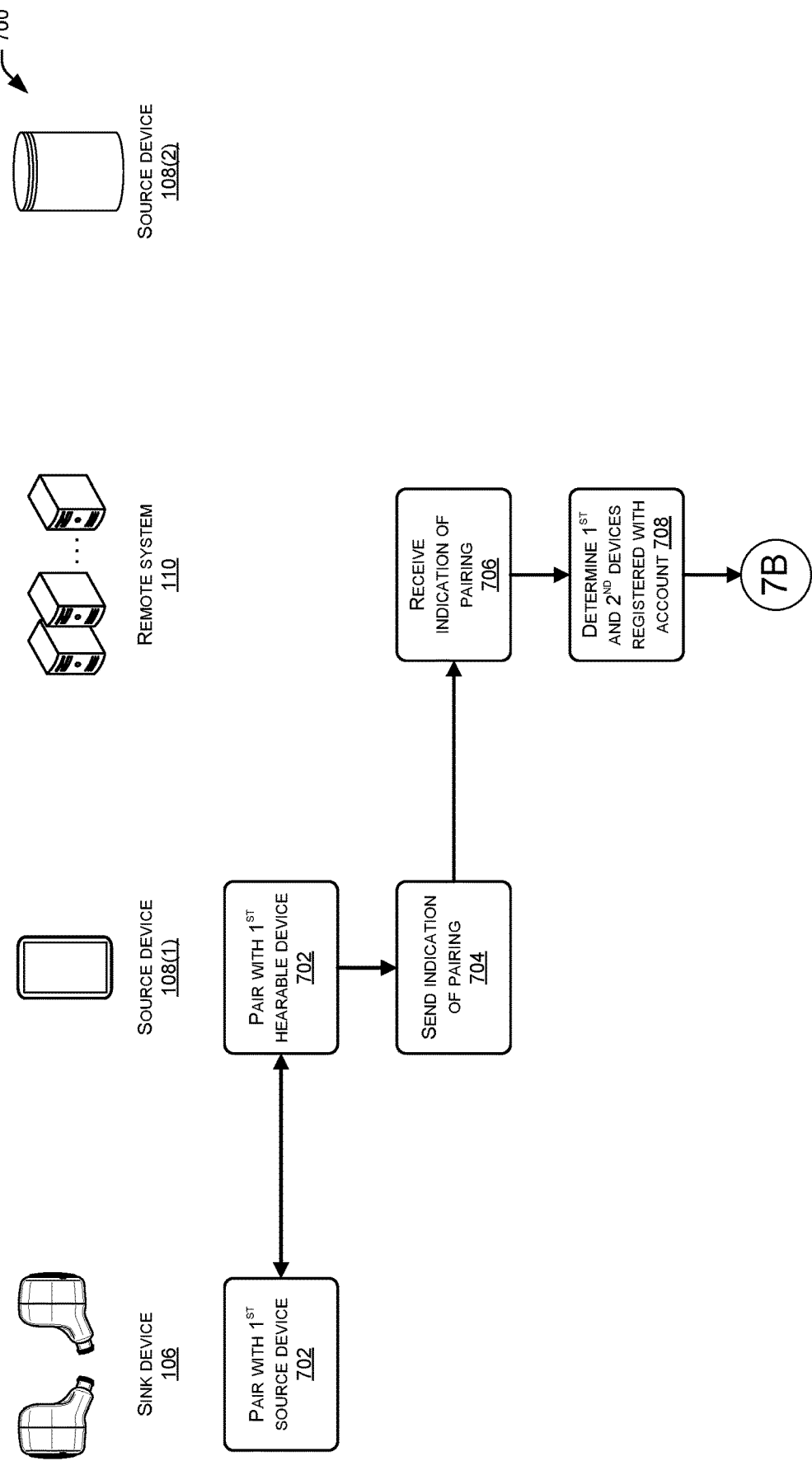
FIGS. 7A-C collectively illustrate a flow diagram of an example process in which a first source device pairs to a hearable device and, in response, a remote system generates first data to enable the first source device to establish a secure connection with the hearable device, as well as second data to enable a second source device to establish a secure connection with the hearable device. In some instances, the second source device is associated with a same user account as the first source device.
Figure 7B:
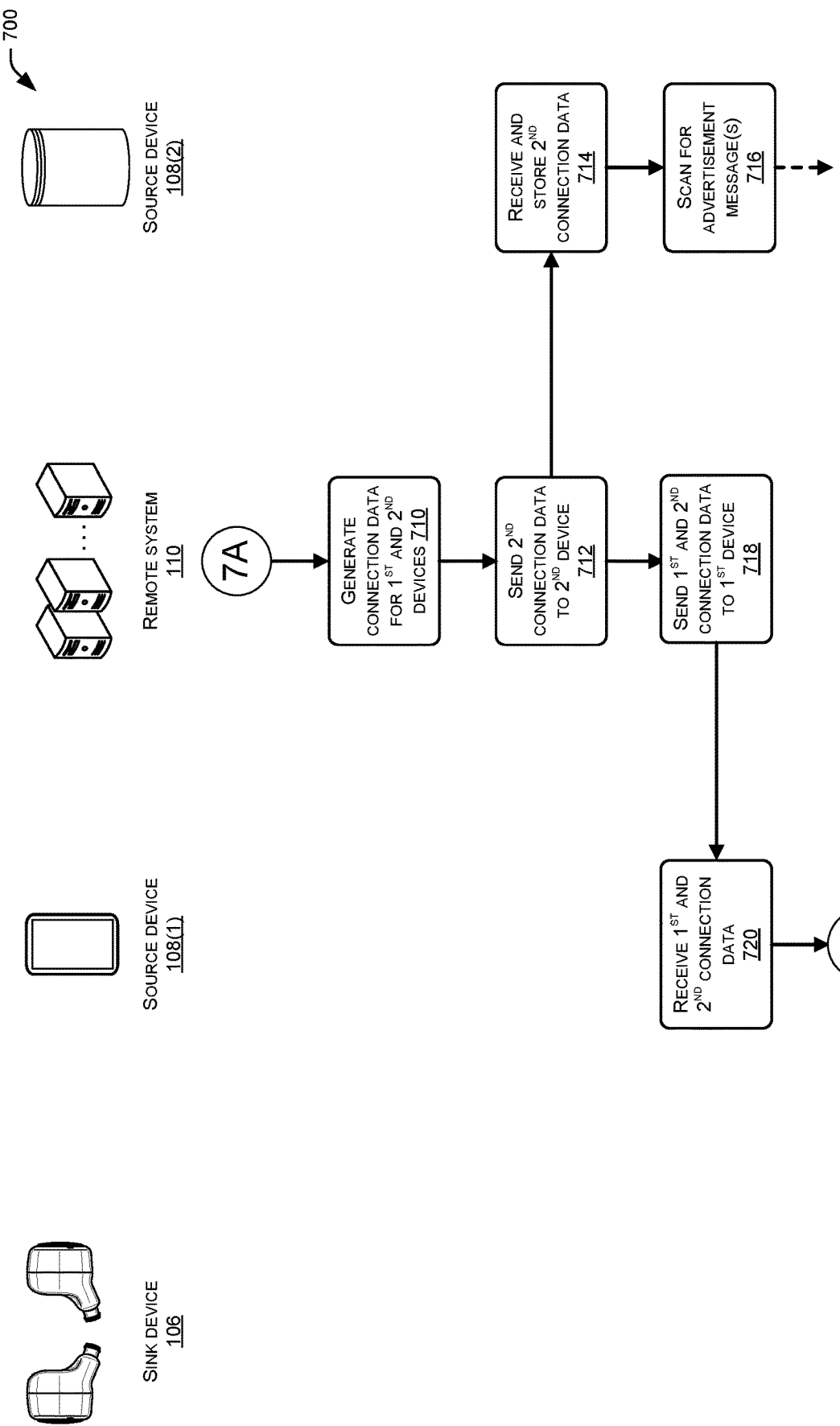
Figure 7C:
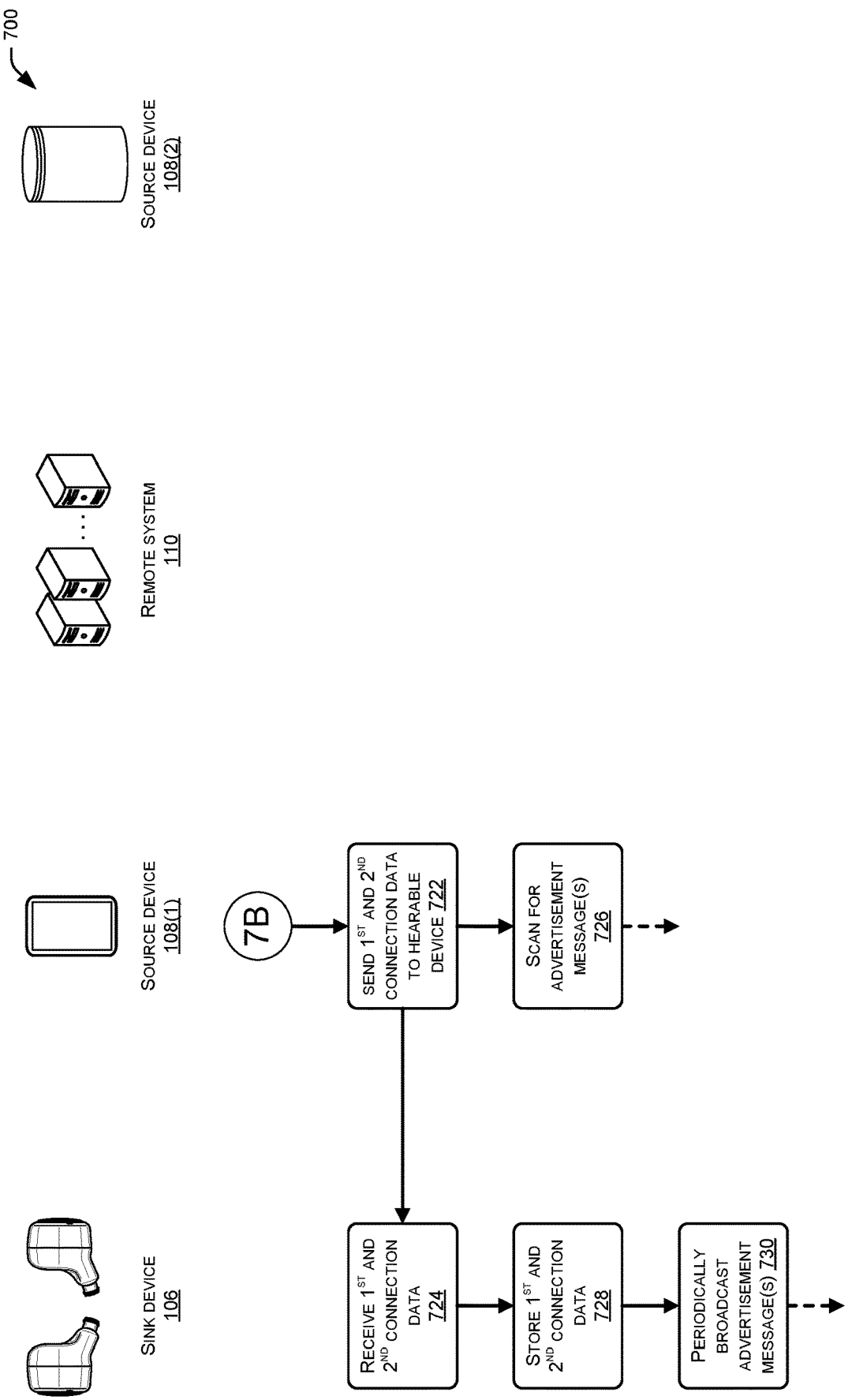

FIGS. 7A-C collectively illustrate a flow diagram of another example process 700 in which a first source device pairs to a sink device and, in response, a remote system generates first data to enable the first source device to establish a secure connection with the sink device, as well as second data to enable a second source device to establish a secure connection with the sink device. In some instances, the second source device is associated with a same user account as the first source device.

At an operation 702, the example sink device 106 and the example first source device 108(1) pair with one another using a wireless protocol, such as Bluetooth. At an operation 704, the first source device sends an indication of the pairing to the remote system 110, which receives this indication at an operation 706. At an operation 708, the remote system 110 determines that both the first source device and a second source device are associated with a common user account.

FIG. 7B continues the illustration and includes, at an operation 710, the remote system 110 generating respective connection data for the first and second source devices. As described above, this may include generating first data for enabling the first source device to connect to the sink device 106 via the wireless protocol and second data for enabling the second source device to connect to the sink device 106 via the wireless protocol. At an operation 712, the remote system sends the second data over one or more networks to the second source device, which receives and stores the second data at an operation 714. At an operation 716, the second source device 108(2) begins performing continuous or periodic scans over the wireless protocol to attempt to detect any advertisement messages sent by the sink device 106.

At an operation 718, meanwhile, the remote system 110 sends the first data and the second data to the first source device 108(1) that was initially paired with the sink device 106. At an operation 720, the first source device 108(1) receives the first and second connection data, and locally stores the first connection data for later use by the first source device 108(1) in establishing a connection with the sink device 106.

FIG. 7C concludes the illustration of the process 700 and includes, at an operation 722, the first source device sending the first and second connection data to the sink device 106, which receives the first and second connection data at an operation 724. At an operation 726, the first source device 108(1), like the second source device 108(2), begins continuously or periodically scanning for advertisement messages via the wireless protocol.

At an operation 728, meanwhile, the sink device 106 may store the receive first and second connection data, such as in a local pairing table of the sink device 106. At an operation 730, the sink device 106 may periodically broadcast or otherwise transmit advertisement messages indicating a current state of the sink device 106.

Figure 8:
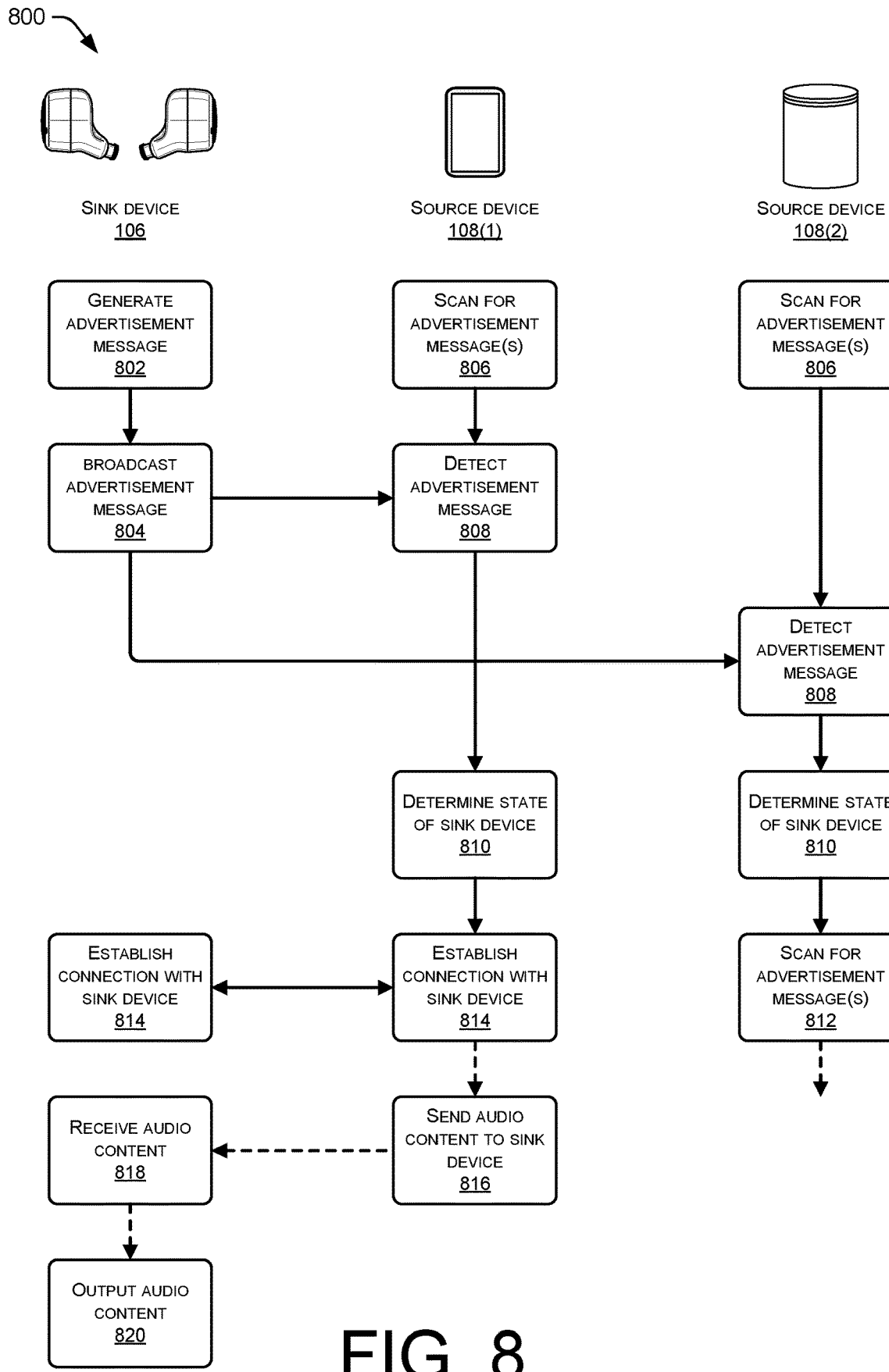
FIG. 8 illustrates a flow diagram of an example process in which a hearable device broadcasts an advertisement message, which one or more source devices may detect. Upon detecting the advertisement message, each source device may use the information indicated in the advertisement message to determine whether to establish a connection with the hearable device.

FIG. 8 illustrates a flow diagram of an example process 800 in which a sink device broadcasts an advertisement message, which one or more source devices may detect. Upon detecting the advertisement message, each source device may use the information indicated in the advertisement message to determine whether to establish a connection with the sink device.

At an operation 802, the sink device 106 generates an advertisement message and, at an operation 804, broadcasts the generated message. In this example, an operation 806 represents both the first source device 108(1) and the second source scanning for such advertisement messages, resulting in both source devices detecting the advertisement messages at an operation 808. At an operation 810, each source device analyzes the advertisement message to identify a current state of the sink device 106.

In this example, the second source device 108(2) determines to refrain from establishing a connection with the sink device 106 and, thus, returns to periodically scanning for advertisement messages at an operation 812. The first source device 108(1), however, determines to establish a connection with the sink device 106 and, thus, establishes a connection with the sink device 106 at an operation 814. In some instances, the first source device 108(1) may establish a connection but not yet begin sending content. In other instances, and as illustrated, the source device may begin sending content to the sink device 106 after establishing the connection. In this example, the first source device 108(1) begins sending audio content to the sink device 106 at an operation 816. At an operation 818, the sink device 106 receives the audio content and begins outputting the audio content at an operation 820.

Figure 9:
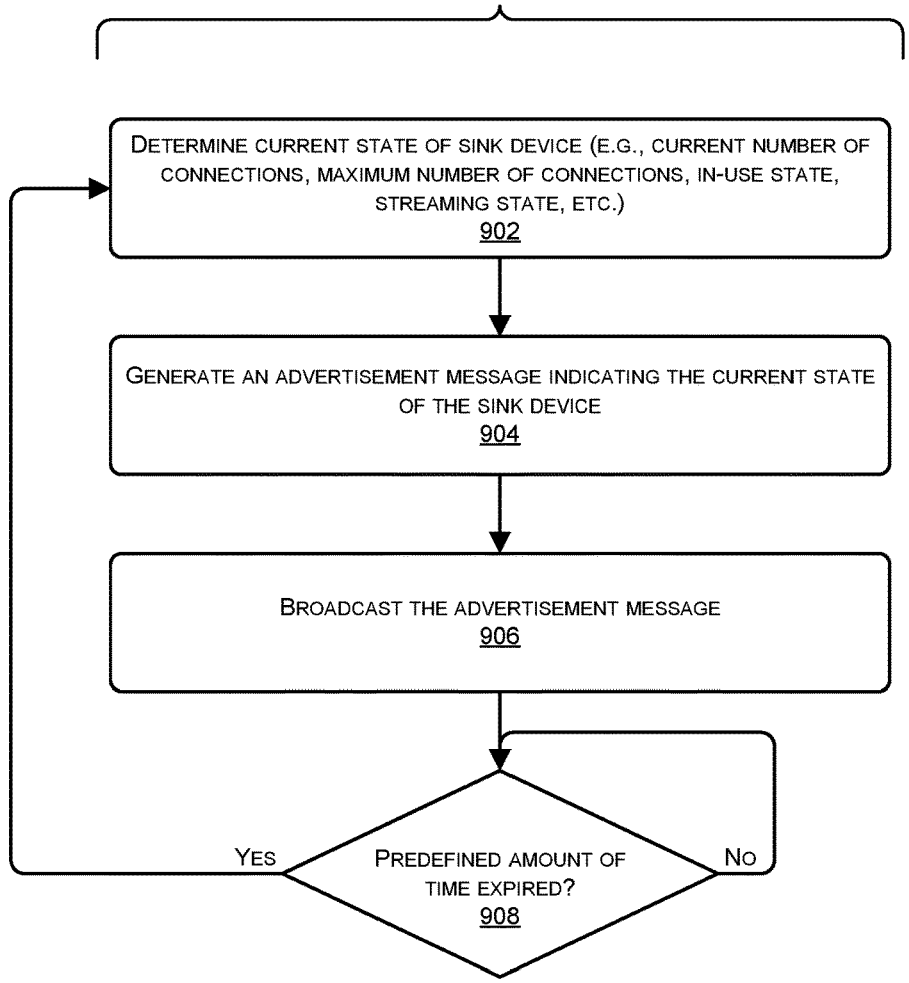
FIG. 9 illustrates a flow diagram of an example process performed by the hearable device for broadcasting periodic advertisement messages to enable source devices to determine whether to establish a connection with the hearable device.

FIG. 9 illustrates a flow diagram of an example process 900 performed by the sink device for broadcasting periodic advertisement messages to enable source devices to determine whether to establish a connection with the sink device. At an operation 902, the sink device 106 determines its current state, which may include a number of source devices to which the sink device 106 is currently connected to, a maximum number of source devices that the sink device 106 is capable of connecting to, whether the sink device 106 is currently in use (e.g., being worn by or otherwise in proximity to a user), whether the sink device 106 is currently receiving and outputting audio, and/or the like.

At an operation 904, the sink device 106 may generate an advertisement message based on the determined state and, at an operation 906, may broadcast this advertisement message. An operation 908 represents determining whether a predefined amount of time has expired since broadcasting the advertisement message. If not, the process 900 awaits the expiration of the predefined amount of time. Upon determining that the predefined amount of time has expired, the process 900 may return to the operation 902, at which point the sink device 106 may again determine its current state, and so on. It is to be appreciated that the sink device 106 may also establish a connection with one or more source devices at any point during the process 900, if one or more source devices make the determination to establish this connection.

Figure 10:
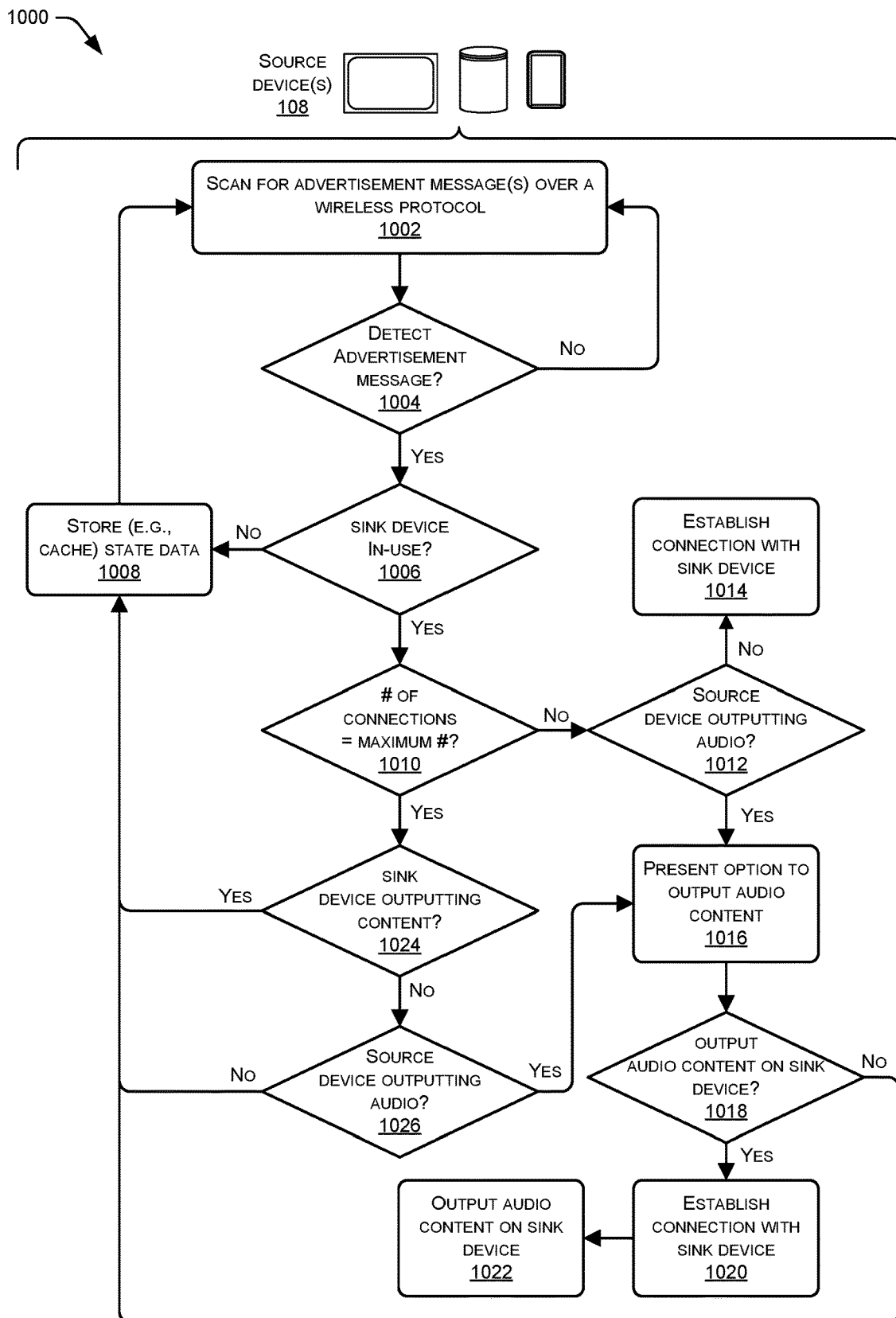
FIG. 10 illustrates a flow diagram of an example process performed by one or more source devices in which each source device performs wireless-protocol scans to attempt to detect advertisement messages and, in response to identifying an advertisement message, determines whether to establish a connection with the device that broadcasted the advertisement message, such as the hearable device of FIG. 6.

FIG. 10 illustrates a flow diagram of an example process 1000 performed by one or more source devices in which each source device performs wireless-protocol scans to attempt to detect advertisement messages and, in response to identifying an advertisement message, determines whether to establish a connection with the device that broadcasted the advertisement message, such as the sink device of FIG. 9. At an operation 1002, an example source device 108 performs a first scan for an advertisement message over a wireless protocol. An operation 1004 represents determining whether the source device 108 detected an advertisement message. If not, the process 1000 may return to the operation 1002. If so, however, then an operation 1006 represents determining whether the advertisement message indicates that the sink device 106 is currently in use (e.g., in a user's ear, in proximity to a user, etc.). If not, then an operation 1008 represents the source device 108 storing (e.g., caching) contents of the advertisement message, such as the state of the sink device 106 indicated by the advertisement message, and returning to the operation 1002.

If the advertisement message indicates that the sink device 106 is currently in user, however, then an operation 1010 represents determining whether the advertisement message indicates that a current number of connections of the sink device 106 is equal to the maximum number of connections. If not, then at an operation 1012 the source device determines whether it is currently outputting audio (or other types of content). If not, then at an operation 1014, the source device establishes a connection with the sink device 106, such as an ACL connection over Bluetooth. That is, given that the source device is proximate to the sink device 106 and the sink device 106 is able to take on at least one additional connection, the source device establishes the connection such that the source device will be ready to send content to the sink device 106 should the source device receive a request to output content, such as audio content.

If, however, the source device determines that it is outputting audio or other content, then an operation 1016 represents presenting an option to a user to output the content on the sink device 106. For instance, this operation may comprise outputting a visual and/or audible query to the user (on the source device, the sink device 106, and/or another device) regarding whether the user would like to output the content on the sink device 106. If so, then at an operation 1020 the source device establishes a connection with the sink device 106 and, at an operation 1022, begins outputting content (e.g., audio content) on the sink device 106. If, however, the user indicates that he or she does not wish to output the content on the sink device 106, then the process returns to the operation 1008 and, thereafter, 1002 to store the current state data and return to scanning for advertisement messages.

Returning to the operation 1010, if the source device determines that the advertisement message indicates that the sink device 106 is connected to its maximum number of connections, then at an operation 1024 the source device determines whether the sink device 106 is currently outputting content. If so, then the source device 108 stores the state data at the operation 1008 and returns to scanning for advertisement messages at operation 1002.

If, however, the sink device 106 is not outputting content, then at an operation 1026 represents determining whether the source device 108 is currently outputting content. If not, then the source device 108 stores the state data at the operation 1008 and returns to scanning for advertisement messages at operation 1002. If so, however, then the process 1000 proceeds to the operation 1016 for presenting, to a user, an option to begin outputting the content of the source device using the sink device 106.

While FIG. 10 illustrates one example flow of operations in which a source device determines whether to establish a connection with a sink device, it is to be appreciated that this process 1000 represents a single example policy that a source device may implement. That is, the source devices described herein may be configured to implement any other type of process for determining whether to establish a connection with a sink device, based on a state of the sink device, a state of the source device, and/or additional information.

Figure 11:
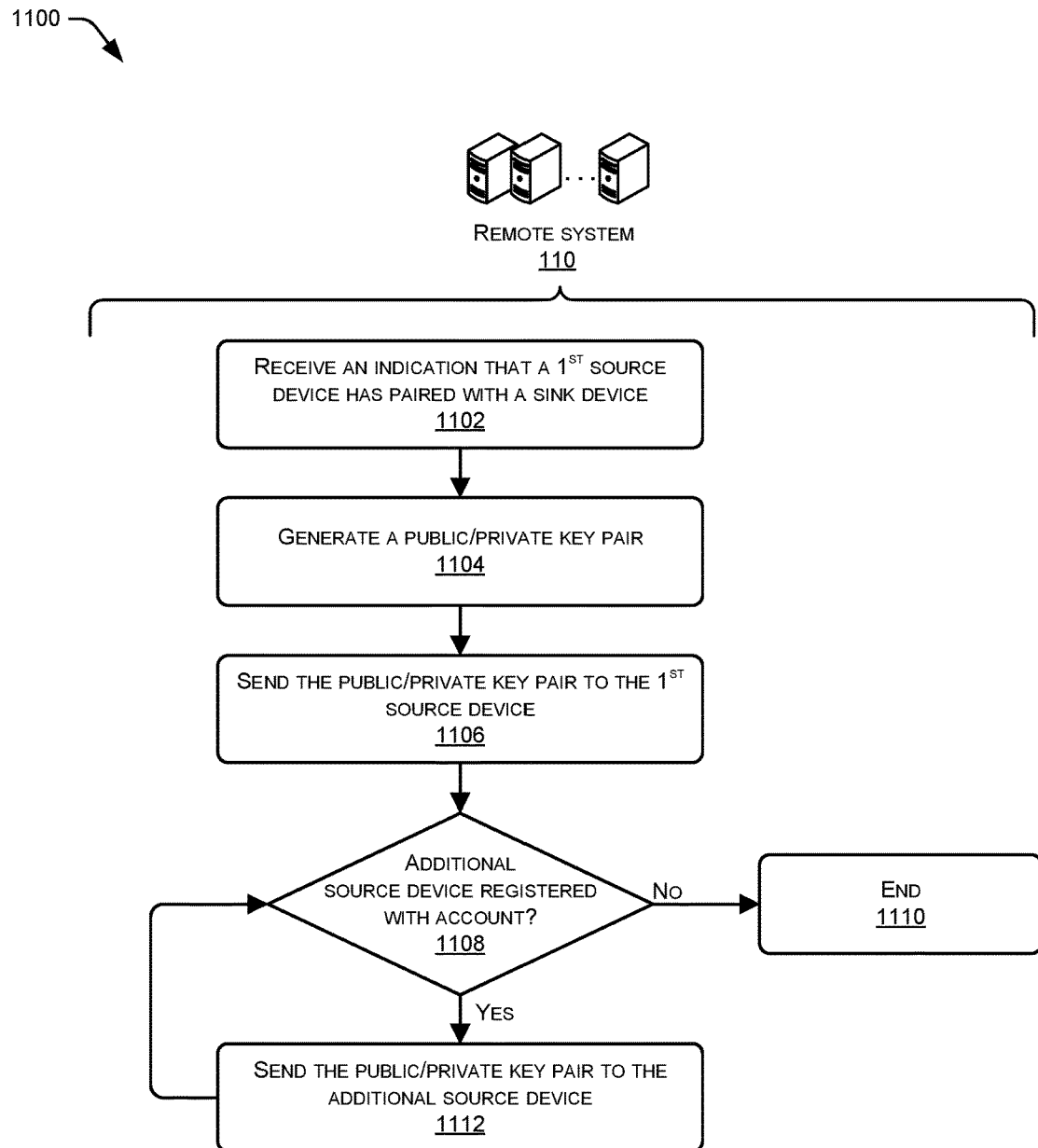
FIG. 11 illustrates a flow diagram of an example process performed by a remote system for automatically pairing, with a hearable or other device, one or more source devices associated with a user account in response to receiving an indication that a first source device associated with the user account has paired with the hearable or other type of device.

FIG. 11 illustrates a flow diagram of an example process 1100 performed by the remote system 100 for automatically pairing, with a sink device, one or more source devices 108 associated with a user account in response to receiving an indication that a first source device 108(1) associated with the user account has paired with the sink device 106. At an operation 1102, the remote system 110 may receive an indication that a first source device 108(1) has paired with a sink device 106. At an operation 1104, the remote system 110 generates connection data (e.g., public/private key pair) for enabling the first source device 108(1) to establish a connection with the sink device 106.

At an operation 1106, the remote system 110 sends the connection data (e.g., public/private key pair) to the first source device 108(1), potentially along with an instruction to send the connection data to the sink device 106. At an operation 1108, the remote system 110 determines an account associated with the first source device 108(1) and/or the sink device 106 using an identifier of the source device 108(1) and/or the sink device 106 and determines whether at least one additional source device is associated with the user account. If not, then the process 1100 ends at 1110. If, however, the remote system 110 determines that the account is associated with at least one additional source device, then at an operation 1112 the remote system 110 may send, to the additional source device, the connection data (e.g., public private key pair) and information associated with the sink device 106 for enabling the additional source device to establish a connection with the sink device 106. The process 1100 then returns to the operation 1108.

Figure 12:
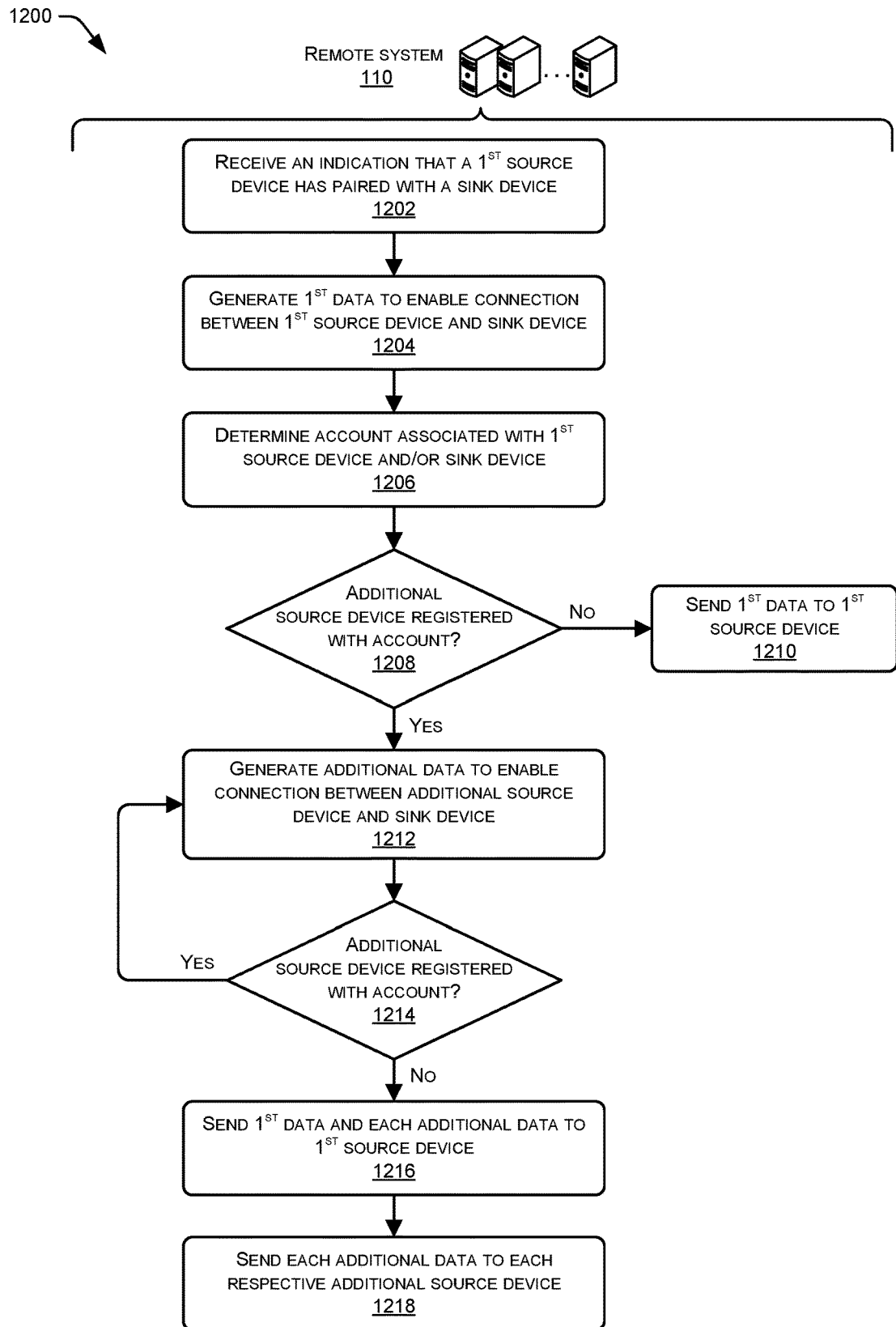
FIG. 12 illustrates a flow diagram of another example process performed by a remote system for automatically pairing, with a hearable or other device, one or more source devices associated with a user account in response to receiving an indication that a first source device associated with the user account has paired with the hearable or other type of device.

FIG. 12 illustrates a flow diagram of another example process 1200 performed by a remote system 110 for automatically pairing, with a sink device 106, one or more source devices associated with a user account in response to receiving an indication that a first source device associated with the user account has paired with the hearable or other type of device. At an operation 1202, the remote system 110 may receive an indication that a first source device 108(1) has paired with a sink device 106. At an operation 1204, the remote system 110 generates first data for enabling the first source device 108(1) to establish a connection with the sink device 106. As described above, this first data may comprise a first encryption key, policy information, and/or the like.

At an operation 1206, the remote system 110 determines an account associated with the first source device and/or the sink device using an identifier of the source device 108(1) and/or the sink device 106. At an operation 1208, the remote system 110 determines whether at least one additional source device is associated with the user account. If not, then at an operation 1210 the remote system 110 sends the first data to the first source device 108(1), potentially along with instruction data to cause the first source device 108(1) to send the first data along to the sink device 106.

If, however, the remote system 110 determines that the account is associated with at least one additional source device, then at an operation 1212 the remote system 110 may generate additional data for enabling the additional source device to establish a connection with the sink device 106. As described above, this data may comprise a unique encryption key, policy information, and/or the like.

At an operation 1214, the remote system 110 determines whether there is still at least one additional source device is associated with the user account. If so, then the process 1200 returns to the operation 1212 for generating additional data for the additional source device. If not, however, then at an operation 1216 the remote system 110 sends the first data and each additional data to the first source device 108(1), potentially along with instruction data to cause the first source device 108(1) to send the first data and each additional data along to the sink device 106. Finally, at an operation 818, the remote system 110 may send each additional data to each respective additional source device. For instance, the remote system 110 may send the second data to the second source device, the third data to the third source device, and so forth.

Figure 13A:
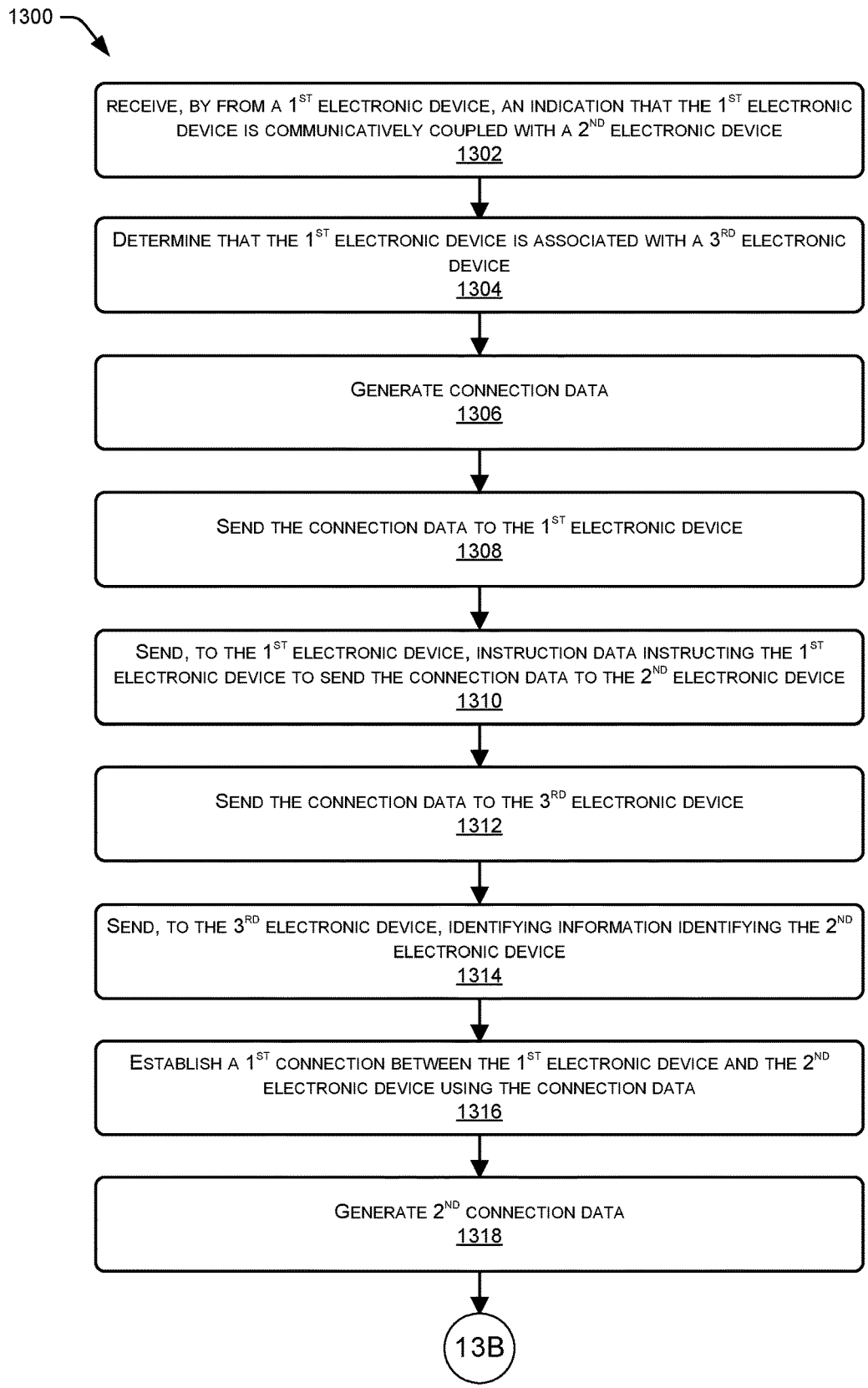
FIGS. 13A-B collectively illustrate a flow diagram of an example process for pairing at least a first device to a second device in response to determining that a third device has paired to the second device.
Figure 13B:
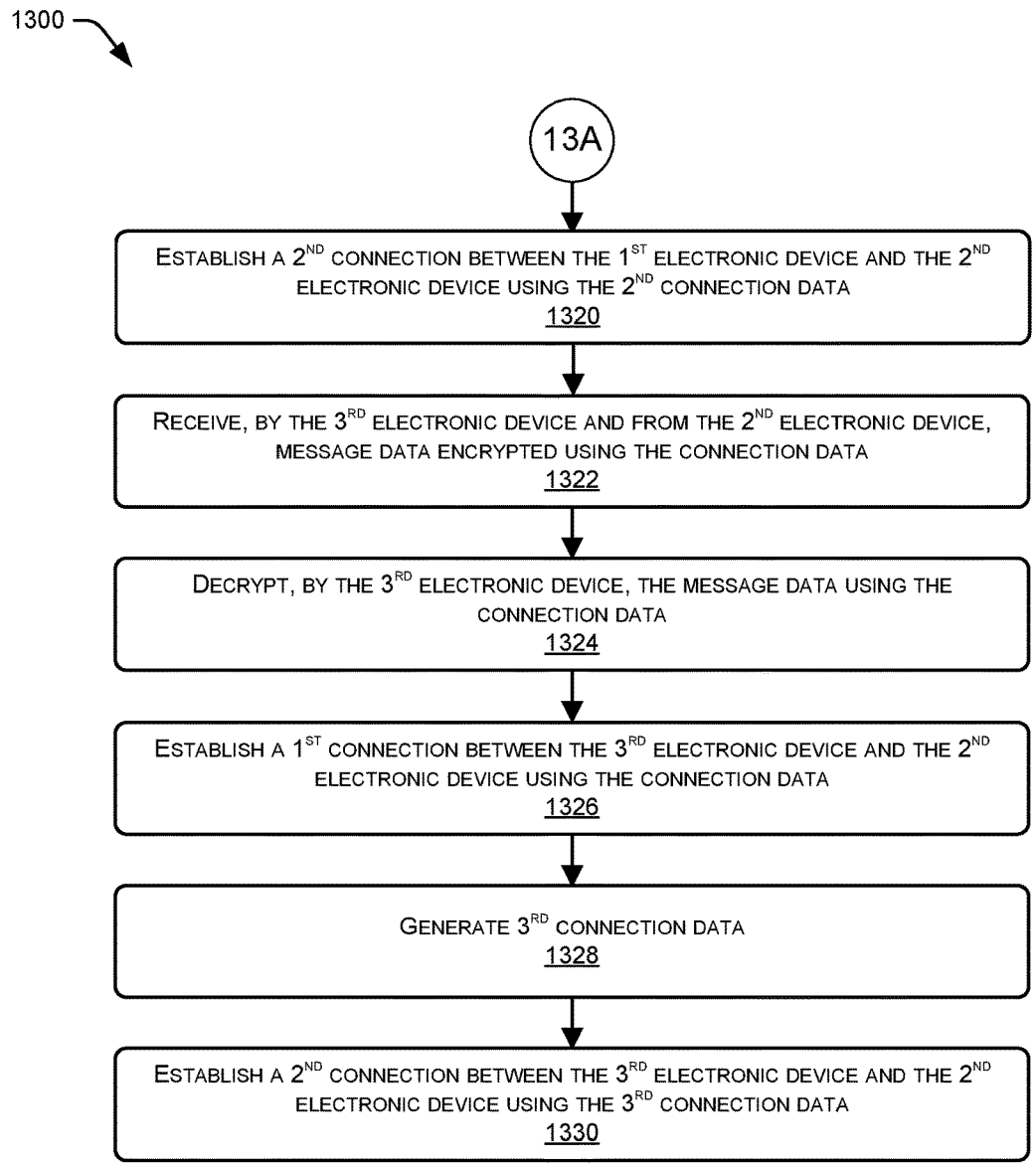

FIGS. 13A-B collectively illustrate a flow diagram of an example process 1300 for establishing connections between devices in an environment based on proximity of the devices to each other a current context.

An operation 1302 represents receiving, by a remote system and from a first electronic device, an indication that the first electronic device is communicatively coupled with a second electronic device. For instance, the remote system may receive an indication that the first electronic device has been manually paired with the second electronic device.

An operation 1304 represents determining, by the remote system, that the first electronic device is associated with a third electronic device. For instance, this operation may comprise determining that the first electronic device (and/or the second electronic device) are associated with a user account and determining, from the user account, that a third electronic device is also associated with the user account.

An operation 1306 represents generating, by the remote system, connection data, wherein the connection data is used by the first electronic device and the second electronic device to communicate with each other and by the third electronic device and the second electronic device to communicate with each other. In some instances, the connection data may comprise a public/private key pair or other cryptographic data for establishing a secure communication channel.

An operation 1308 represents sending, by the remote system, the connection data to the first electronic device. In addition, an operation 1310 represents sending, by the system and to the first electronic device, instruction data instructing the first electronic device to send the connection data to the second electronic device. Upon receiving this instruction data, the first electronic device may send the connection data to the second electronic device.

An operation 1312 represents sending, by the remote system, the connection data to the third electronic device, while an operation 1314 represents sending, by the remote system and to the third electronic device, identifying information associated with the second electronic device, wherein the identifying information is used by the third electronic device to establish a connection with the second electronic device.

An operation 1316 represents establishing a first connection between the first electronic device and the second electronic device using the connection data. Thereafter, an operation 1318 represents generating, by at least one of the first electronic device or the second electronic device, second connection data, wherein the second connection data is used by the first electronic device and the second electronic device to establish subsequent connections. For instance, this second connection data may comprise new encryption keys and may be generated using a shared secret and/or other cryptographic techniques.

FIG. 13B continues the illustration of the process and includes, at an operation 1320, establishing a second connection between the first electronic device and the second electronic device using the second connection data. That is, during the same or a subsequent communication session, the first and second electronic devices may establish and communicate via a secure communication channel that is encrypted using the second connection data.

An operation 1322, meanwhile, represents receiving, by the third electronic device and from the second electronic device, message data including encrypted data that has been encrypted using at least a portion of the first connection data. For instance, this message data may comprise the advertisement data described above, as encrypted using the private key of the public/private key pair. An operation 1324 represents decrypting, by the third electronic device, the encrypted data using at least a portion of the first connection data. For instance, the third electronic device may use the private key of the public/private key pair to decrypt the message.

An operation 1326 represents establishing a first connection between the third electronic device and the second electronic device using the connection data. That is, in response to decrypting the message, the third electronic device may be configured to establish a connection with the second electronic device using the connection data for the purpose of negotiating new, unique cryptographic data for subsequent communication sessions.

An operation 1328 represents generating, by at least one of the third electronic device or the second electronic device, third connection data, wherein the third connection data is used by the third electronic device and the second electronic device to establish subsequent connections. For instance, this third connection data may comprise new encryption keys and may be generated using a shared secret and/or other cryptographic techniques. Finally, an operation 1330 represents establishing a second connection between the third electronic device and the second electronic device using the second connection data. That is, during the same or a subsequent communication session, the second and third electronic devices may establish and communicate via a secure communication channel that is encrypted using the third connection data.

Figure 14:
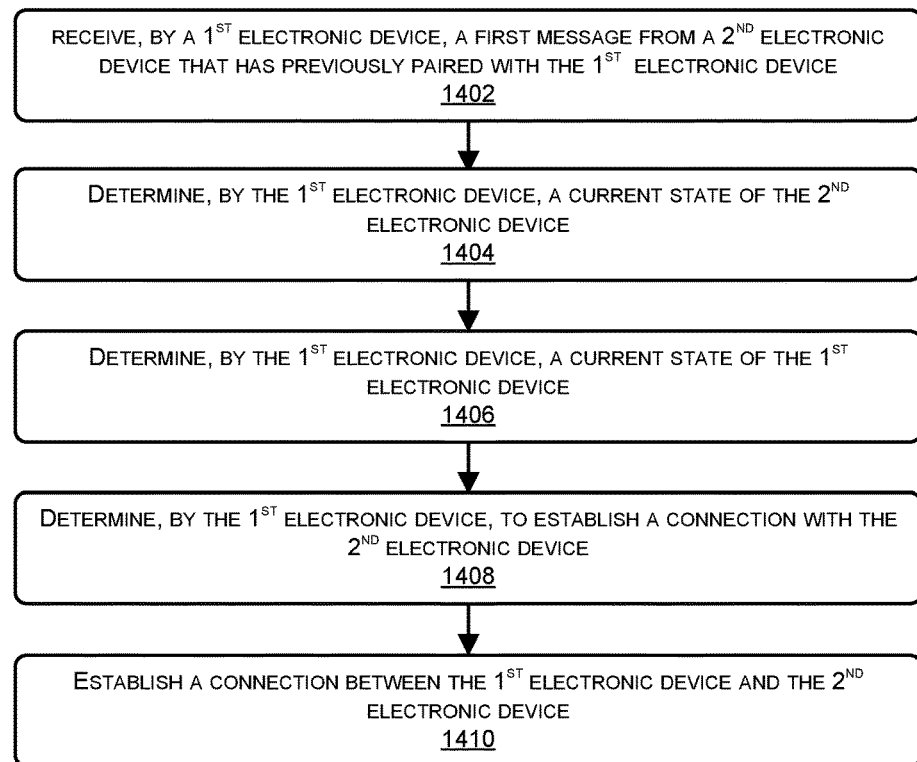
FIG. 14 illustrates a flow diagram of an example process for establishing connections between devices in an environment based on proximity of the devices to each other a current context.

FIG. 14 illustrates a flow diagram of an example process 1400 for pairing at least a first device to a second device in response to determining that a third device has paired to the second device.

An operation 1402 represents receiving, by a first electronic device, a first message from a second electronic device that has previously paired with the first electronic device. In some instances, the first message may comprise an advertisement message, which may be broadcasted by a hearable device, a wearable device, an animatronic device, or any other type of electronic (e.g., secondary) device.

An operation 1404 represents determining, by the first electronic device and based at least in part on the first message, a current state of the second electronic device. In some instances, the current state may comprise at least a number of devices that the second electronic device is currently connected to, a maximum number of connections that the second electronic device is able to maintain, and whether the second electronic device is currently in use (e.g., outputting content, being worn, etc.).

An operation 1406 represents determining, by the first electronic device, a current state of the first electronic device. This may comprise an indication of whether the first electronic device is currently outputting content, such as audio content, video content, or the like.

An operation 1408 represents determining, by the first electronic device, to establish a connection with the second electronic device based at least in part on the current state of the second electronic device. In some instances, this operation may be performed using, for example, the process 1000 described above and/or using any other preconfigured policy. Finally, an operation 1410 represents the first electronic device establishing a connection with the second electronic device.

Figure 15:
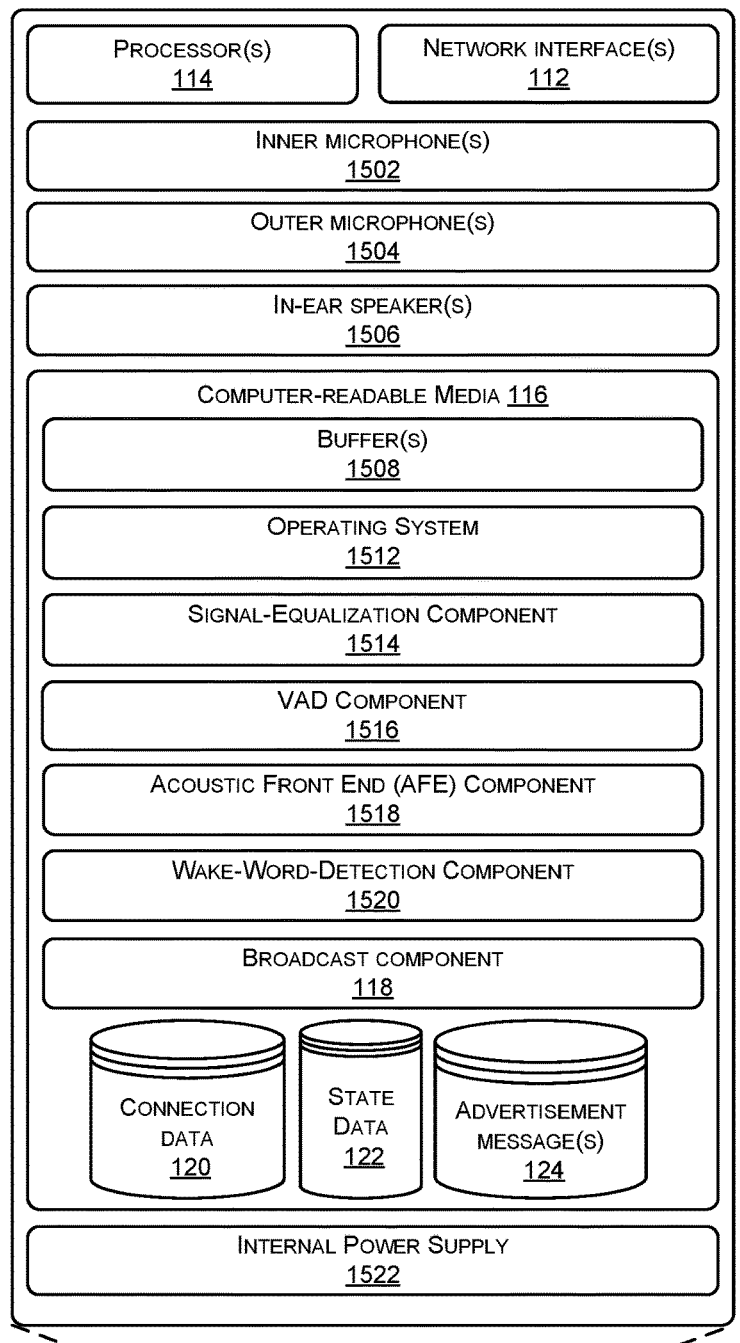
FIG. 15 illustrates a block diagram of an example architecture of an hearable device that includes components for some of the techniques described herein.

FIG. 15 illustrates a block diagram of an example architecture of sink device 106, such as an ear-based device. In some instances, the sink device 106 comprises an ear-based or hearable device that includes components for determining that a user of the ear-based device issued a voice command, and for performing voice-processing techniques on an audio signal representing the voice command.

When in the form of an ear-based device, the sink device 106 may include any type of in-ear computing device that may be positioned on or around an ear of the user, in the ear of the user, or otherwise associated with an ear of the user. In the illustrated implementation, the sink device 106 includes one or more processors 114 configured to power various components of the sink device 106. Further, the sink device 106 may include various hardware-based components, such as one or more in-ear microphones 1502, one or more exterior microphones 1504, one or more in-ear speaker(s) 1506, one or more acoustic isolation components, and one or more buffers 1508.

The in-ear microphone(s) 1502 and exterior microphone(s) 1504 may function as input devices to receive audio input, such as a voice command from a user. The in-ear microphone(s) 1502 and exterior microphone(s) 1504 may comprise any type of component, such as a transducer, which converts sound into an electrical signal (e.g., audio data). The in-ear microphone(s) 1502 may be positioned on or in the sink device 106 such that the in-ear microphone(s) 1502 are able to detect and capture in-era sound emitting from the ear canal of the user's ear. The exterior microphone(s) 1504 may be positioned on or in the sink device 106 such that the exterior microphone(s) 1504 are able to detect and capture exterior sound emitting from an environment surrounding the user. The in-ear speaker(s) 1506 may function as an output device to output audio sounds corresponding to audio data, which may be stored in the buffer(s) 1508 of the sink device 106, another memory location, and/or be received from another computing device communicatively coupled to the sink device 106. In some examples, the in-ear speaker(s) 1506 may emit audible statements to communicate with the user, and the user may respond or otherwise issue voice commands, which may be captured by the microphone(s) 1502 and/or 1504. Thus, the in-ear speaker(s) 1506 may be used in conjunction with the microphone(s) 1502 and/or 1504 to facilitate a conversation with the user. The in-ear speaker(s) 1506 may output various types of audio data, such as audio data from a phone call (e.g., a phone call conducted through the user device and communicated to the ear-based device 106 using a wireless network), music audio data, or any other type of audio data.

The sink device 106 may further include the buffer(s) 1508 for storing, at least temporarily, various types of data. For instance, if the sink device 106 is outputting audio data using the in-ear speaker(s) 1506, the buffer(s) 1508 may store portions of the audio data prior to outputting the audio data. By storing audio data in the buffer(s) 1508, the ear-based device 106 may perform various types of noise-cancellation techniques. As another example, the buffer(s) 1508 may store exterior audio data generated the exterior microphone(s) 1504 that represents the exterior sound. The exterior audio data may be used for various purposes, such as for performing active acoustic isolation to reduce the amount of exterior sound that reaches the in-ear microphones(s) 1502. For instance, acoustic isolation component(s) may identify a waveform from the exterior audio data store in the buffer(s) 1508 that represents ambient noise from the environment of the user, or other unwanted noise, generate a waveform configured to cancel out or attenuate the ambient noise, and cause the in-ear speaker(s) 1506 (and/or other speakers on the sink device 106 not illustrated) to output sound corresponding to the waveform to perform active acoustic isolation. In some examples, the acoustic isolation component(s) may comprise a material (e.g., foam) that may, at least partially, acoustically isolate the in-ear microphone(s) 1502 from the exterior microphone(s) 1504.

The sink device 106 may further include computer-readable media 116 which stores various software components, firmware components, or combinations thereof. The components stored in the computer-readable media 116 may comprise computer-readable instructions (e.g., software, firmware, a combination thereof, etc.) which configured the processor(s) 114 to perform various operations. The computer-readable media 116 may store an operating system 1512 configured to manage hardware, software, firmware, and/or other systems and services within and coupled to the sink device 106. The computer-readable media 116 may additionally store one or more applications, such as music playing applications, telephone call conducting applications, or any other type of applications appropriate for a sink device 106. The applications may be configured to play songs or other audio data/files by causing the processor(s) 700 to output audio data using the in-ear speaker(s) 132.

The computer-readable media 116 may include a signal-equalization component 1514 that, when executed by the processor(s) 114, may perform various types of equalization techniques on the audio signals generated by the in-ear microphone(s) 1502 and/or the exterior microphone(s) 1504. To perform the equalization techniques, the signal-equalization component 1514 may include or utilize components such as one or more filters (e.g., low-pass filter, high-pass filter, band-pass filter, etc.) to attenuate frequencies, one or more frequency amplifiers (e.g., operation amplifiers) to boost/amplify frequencies, and/or any other type of equalization processing techniques. In some examples, the signal-equalization component 1514 may equalize one or both of the exterior audio signal and inner audio signal. For example, the exterior sound captured by the exterior microphone(s) 1504 may include ambient noise from the environment of the user, a frequency response caused by the auricle of the user's ear (e.g., a head-related transfer function (HRTF) response), high amplitude peaks, and other types of undesirable attributes. In such examples, the signal-equalization component 1514 may include or utilize various components to, for example, attenuate a portion of the exterior audio signal, filter out a portion of the exterior audio signal, and other types of equalization techniques. Additionally, the signal-equalization component 1514 may perform equalization techniques on the inner audio signal. The inner audio signal may represent the in-ear sound that is transmitted through the inner-ear of the user and out the ear canal and may be affected by bone of the inner-ear, tissue of the inner-ear, etc., though which the sound passes. For instance, sound from the user that emits from the user's ear canal may have a lower resonance based on the length of the user's ear canal, a fall-off at higher frequencies, and/or lack amplitude peaks when compared to sound that comes from the user's mouth. In light of this, the signal-equalization component 1514 may perform equalization techniques on the inner audio signal, such as attenuating/modifying a portion of the inner audio signal, filtering out a portion of the inner audio signal, etc. Accordingly, the signal-equalization component 1514 may perform equalization techniques on one or both of the inner audio signal and the outer audio signal such that the two audio signals are in a same, or similar, bandwidth, which may help identify correlations between the two signals.

The computer-readable media 116 may further include a voice activity detection (VAD) component 200 1516 to perform techniques for detecting a voice of the user. The VAD component 312 may utilize one or more VAD algorithms based on channel energy with long and short term energies, sub-band long and short term energies with combination logic, Deep Neural Network (DNN) based VADs, or any other type of VAD algorithms.

The computer-readable media 116 may further include an acoustic front end (AFE) component 1518 to perform various acoustic-processing techniques on the audio signals, such as beamforming, noise-cancellation, echo cancellation, and so forth. Further, the computer-readable media 116 may include a wake-word-detection component 1520 to detect, in one or more of the exterior audio signal, the inner audio signal, and/or the correlated audio signal, a wake word or keyword. Finally, the media 116 may further store the broadcast component 118, the connection data 120, the state data 122, and the advertisement messages 124, as described above.

The sink device 106 may be powered, at least partially, be an internal power supply 1522. For instance, the sink device 106 may include one or more of batteries, battery banks, supercapacitors, rechargeable batteries, or any other type of internal power supply which may be charged using mains-power and provide power to the sink device 106.

The sink device 106 may further include the one or more network interfaces 112 that may be utilized by the sink device 106 to communicate with other devices over networks, such as the network(s) 154. Generally, the network interface(s) 112 enable the sink device 106 to communicate over any type of network, such as a wired network (e.g., USB, Auxiliary, cable etc.), as well as wireless networks (e.g., WiFi, Bluetooth, Personal Area Networks, Wide Area Networks, and so forth). In some examples, the network interface(s) 112 may include a wireless unit coupled to an antenna to facilitate wireless connection to a network. However, the network interface(s) may include any type of component (e.g., hardware, software, firmware, etc.) usable by the sink device 106 to communicate over any type of wired or wireless network. The network interface(s) 112 may enable the sink device 106 to communicate over networks such as a wireless or Wi-Fi network communications interface, an Ethernet communications interface, a cellular network communications interface, a Bluetooth communications interface, etc., for communications over various types of networks 154, including wide-area network, local-area networks, private networks, public networks etc. In the case of a wireless communications interfaces, such network interface(s) 112 may include radio transceivers and associated control circuits and logic for implementing appropriate communication protocols.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) may possess its own local memory, which also may store program modules, program data, and/or one or more operating systems. The processors(s) may be located in a single device or system, or across disparate devices or systems, which may be owned or operated by various entities.

The computer-readable media described herein may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device, comprising:
   a wireless network interface;
   one or more processors; and
   one or more computer-readable media storing computer-executable instructions that, when executed, cause the one or more processors to perform acts comprising:
   receiving, via the wireless network interface, a first message from a hearable device that has previously paired to the electronic device, the first message including information about a current state of the hearable device;
   determining, based at least in part on the information about the current state, that the hearable device is currently being worn by a user;
   determining, based on the information about the current state, that the hearable device is connected to a first number of source devices that is less than a maximum number of source devices that the hearable device is capable of concurrently connecting to; and
   establishing, using the wireless network interface, a connection with the hearable device based at least in part on determining that the hearable device is currently being worn by the user and that the hearable device is connected to a first number of source devices that is less than the maximum number of source devices.

2. The electronic device as recited in claim 1, wherein the one or more computer-readable media further store computer-executable instructions that, when executed, cause the one or more processors to perform acts comprising:
   determining that the electronic device is currently outputting audio data; and
   presenting, on a display of the electronic device, an option to output the audio data to the hearable device.

3. The electronic device as recited in claim 1, wherein the one or more computer-readable media further store computer-executable instructions that, when executed, cause the one or more processors to perform acts comprising:
   determining, based at least in part on the information about the current state, that the hearable device is not currently outputting audio data;
   and wherein the establishing comprises establishing the connection with the hearable device based at least in part on determining that the hearable device is not currently outputting audio data.

4. A method comprising:
   receiving, by a first electronic device, a first message from a hearable device that has previously paired with the electronic device;
   determining, by the first electronic device and based at least in part on the first message, a current state of the hearable device, the current state indicating (i) a first number of devices that the hearable device is currently connected to, (ii) a maximum number of concurrent connections that the hearable device is able to maintain, and (iii) that the hearable device is currently being worn by a user;
   determining that the first number of devices that the hearable device is currently connected to is less than the maximum number of concurrent connections that the hearable device is able to maintain; and
   establishing, by the first electronic device, a connection with the hearable device based at least in part on the current state of the hearable device and on determining that the first number of devices to which the hearable device is currently connected to is less than the maximum number of concurrent connections that the hearable device is able to maintain.

5. The method as recited in claim 4, further comprising:
   determining that the current state of the hearable device further indicates that the hearable device is currently receiving audio content from a second electronic device; and
   outputting, by the first electronic device and based at least in part on the determining that the hearable device is currently receiving audio content from the second electronic device, a query regarding whether to send audio data from the first electronic device to the hearable device.

6. The method as recited in claim 4, further comprising:
   determining that the current state of the hearable device further indicates that the hearable device is not currently receiving audio data; and
   establishing, by the first electronic device, the connection with the hearable device is further based at least in part on determining that the hearable device is not currently receiving audio data.

7. The method as recited in claim 4, further comprising:
   determining, by the hearable device, the first number of devices that the hearable device is currently connected to;
   determining, by the hearable device, the maximum number of concurrent connections that the hearable device is able to maintain;
   determining, by the hearable device, that the hearable device is currently being worn by the user;
   generating, by the hearable device, the first message indicating (i) the first number of devices that the hearable device is currently connected to, (ii) the maximum number of concurrent connections that the hearable device is able to maintain, and (iii) that the hearable device is currently being worn by the user; and
   sending the first message.

8. The method as recited in claim 7, wherein the sending the first message comprises broadcasting the first message over a short-range wireless network.

9. The method as recited in claim 7, further comprising determining, by the hearable device, whether the hearable device is currently outputting audio content, and wherein the first message further indicates whether the hearable device is currently outputting audio content.

10. The method as recited in claim 4 further comprising periodically sending, by the hearable device, a respective message indicating a respective current state of the hearable device.

11. A method comprising:
    receiving, by a first electronic device, a first message from a second electronic device that has previously paired with the first electronic device;
    determining, by the first electronic device and based at least in part on the first message, a current state of the second electronic device, the current state indicating at least: (i) a number of devices that the second electronic device is currently connected to, (ii) a maximum number of concurrent connections that the second electronic device is able to maintain, and (iii) that the second electronic device is currently in use;

determining that the number of devices that the second electronic device is currently connected to is less than the maximum number of concurrent connections that the second electronic device is able to maintain; and establishing, by the first electronic device, a connection with the second electronic device based at least in part on determining that the number of devices to which the second electronic device is currently connected to is less than the maximum number of concurrent connections that the second electronic device is able to maintain.

12. The method as recited in claim 11, wherein the determining whether the second electronic device is currently in use comprises determining whether the second electronic device is currently being worn by a user or is currently outputting content.

13. The method as recited in claim 12, wherein the second electronic device is a hearable device or an animatronic device.

14. The method as recited in claim 12, wherein:
the determining the current state of the second electronic device further comprises determining, based at least in part on the first message, that the second electronic device is currently receiving content from a third electronic device; and
the method further comprises outputting, by the first electronic device and based at least in part on the determining that the second electronic device is currently receiving content from a third electronic device, a query regarding whether to output, at the second electronic device, content provided by the first electronic device.

15. The method as recited in claim 12, wherein:
the determining the current state of the second electronic device further comprises determining, based at least in part on the first message, that the second electronic device is not currently receiving content from a source device; and
the determining to establish the connection comprises determining, by the first electronic device, to establish the connection with the second electronic device based at least in part on determining that the second electronic device is not currently receiving content.

16. The method as recited in claim 12, further comprising:
determining, by the second electronic device, the first number of devices that the second electronic device is currently connected to;
determining, by the second electronic device, the maximum number of concurrent connections that the second electronic device is able to maintain;
determining, by the second electronic device, that the second electronic device is currently in use;
generating, by the second electronic device, the first message indicating (i) the first number of devices that the second electronic device is currently connected to, (ii) the maximum number of concurrent connections that the second electronic device is able to maintain, and (iii) that the second electronic device is currently in use; and
sending the first message.

17. The method as recited in claim 16, wherein the sending the first message comprises broadcasting the first message over a short-range wireless network.

18. The method as recited in claim 16, further comprising determining, by the second electronic device, whether the second electronic device is currently outputting audio content, and wherein the first message further indicates whether the second electronic device is currently outputting audio content.

* * * * *